United States Patent [19]

Matsushima et al.

[11] Patent Number: 5,159,688
[45] Date of Patent: * Oct. 27, 1992

[54] INFORMATION PROCESSOR PERFORMING INTERRUPT OPERATION IN TWO MODES

[75] Inventors: Osamu Matsushima; Yukio Maehashi; Shigetatsu Katori; Masahiro Nomura; Hiroko Shinohara; Kohichi Kariya; Mitsue Abe, all of Tokyo, Japan

[73] Assignee: NEC Corporation, Tokyo, Japan

[*] Notice: The portion of the term of this patent subsequent to Jul. 30, 2008 has been disclaimed.

[21] Appl. No.: 691,284

[22] Filed: Apr. 25, 1991

Related U.S. Application Data

[63] Continuation of Ser. No. 287,622, Dec. 20, 1988, Pat. No. 5,036,458, which is a continuation of Ser. No. 707,617, Mar. 4, 1985, abandoned.

[30] Foreign Application Priority Data

| Mar. 2, 1984 | [JP] | Japan | 59-40004 |
| Mar. 2, 1984 | [JP] | Japan | 59-40005 |
| Mar. 2, 1984 | [JP] | Japan | 59-40006 |
| Mar. 2, 1984 | [JP] | Japan | 59-40007 |
| Mar. 2, 1984 | [JP] | Japan | 59-40008 |
| Mar. 2, 1984 | [JP] | Japan | 59-40009 |
| Mar. 2, 1984 | [JP] | Japan | 59-40010 |
| Sep. 6, 1984 | [JP] | Japan | 59-86811 |

[51] Int. Cl.$^5$ .................. G06F 9/46; G06F 9/30
[52] U.S. Cl. .................. 395/725; 395/375; 395/275; 364/DIG. 1; 364/232.9; 364/242.1; 364/280.8; 364/262.7; 364/247.3
[58] Field of Search ... 364/200 MS File, 900 MS File, 364/DIG. 1; 395/375, 275, 725

[56] References Cited

U.S. PATENT DOCUMENTS

| 3,373,408 | 3/1968 | Ling | 364/200 |
| 3,909,794 | 9/1975 | Soltsien | 364/200 |
| 4,091,447 | 5/1978 | Dillon et al. | 364/200 |
| 4,250,546 | 2/1981 | Boney et al. | 364/200 |
| 4,530,049 | 7/1985 | Zee | 364/200 |

Primary Examiner—Eddie P. Chan
Attorney, Agent, or Firm—Sughrue, Mion, Zinn, Macpeak & Seas

[57] ABSTRACT

An information processor has at least one interface unit by which the processor is coupled to a peripheral equipment. The interface unit can selectively generate either a first mode signal or a second mode signal when the processor performs an interruption operation according to request from the peripheral equipment. When the processor performs the interruption operation in response to the first mode signal, a stack operation for saving information necessary to restart a program execution which is stopped by the interruption to a stack memory is performed before start of the interruption operation. While the processor can perform the interruption operation in response to the second mode signal without the stack operation, whereby an improved processor with less overhead can be provided.

12 Claims, 11 Drawing Sheets

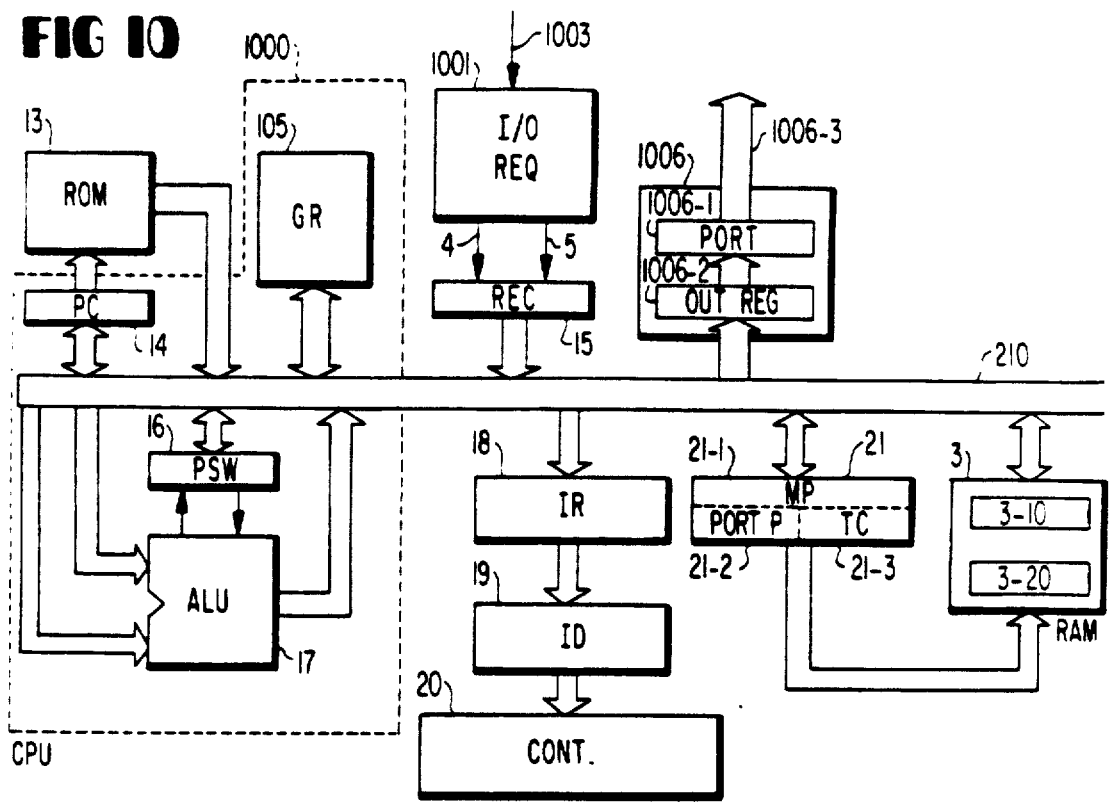
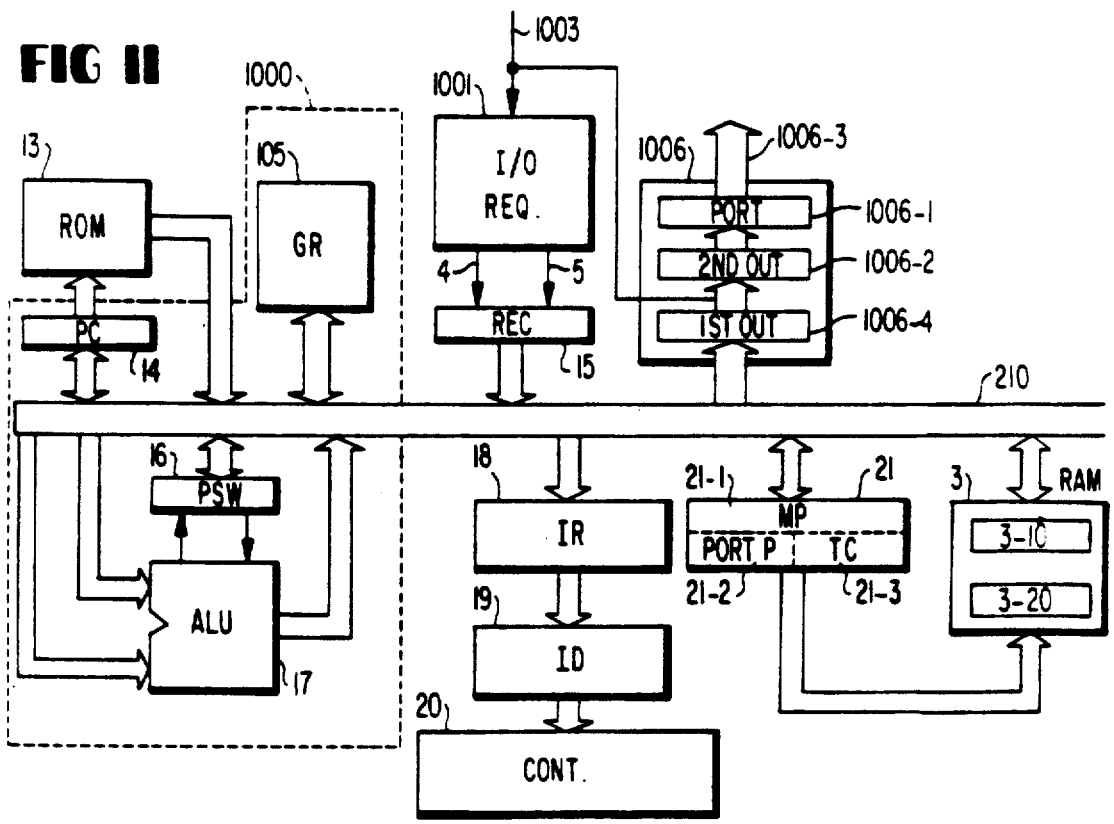

INFORMATION PROCESSOR PERFORMING INTERRUPT OPERATION IN TWO MODES

BACKGROUND OF THE INVENTION

This is a continuation of application No. 07/287,622, filed Dec. 20, 1988, now U.S. Pat. No. 5,036,458, and which is a continuation of application No. 06/707,617, filed Mar. 4, 1985, now abandoned.

The present invention relates to an information processor having an interruption operating function, and more particularly to an information processor having at least one interface circuit for transmitting an interruption request from an interruption source to the information processor.

An interruption operating function is an important function of an information processor, and is necessary in a microprocessor which is coupled to at least one peripheral equipment. Two types of response systems transmitting a processing request from peripheral equipment have been proposed. One is a system wherein the existence of a processing request from peripheral equipment is monitored on a program at all times by a central processing unit (hereinafter called CPU) in an information processor. This system generally is called a polling system. With this system, the CPU is not capable of working for essential data processing actively, but only monitors the presence of the processing request from the peripheral equipment, and therefore cannot execute programs efficiently at high speed.

The other proposed system is an interruption system. With this system, the CPU does not monitor the peripheral equipment directly, rather, only a processing request is generated from the peripheral equipment in the form of an interruption to the CPU, desired data processing is carried out in the CPU according to an interruption handling program. As compared with the polling system, the interruption system enhances the program execution efficiency.

In this interruption mode, however, the CPU must save the processing status indicating current condition of the CPU in stack means before the interruption processing is started, in order to correctly restart the program execution which is stopped by the interruption. To save the processing status, contents of a program counter, a status word register and other registers which are holding information necessary to execute the program are to be stored in the stack means (for example, a random access memory is generally used) through internal buses in the CPU. Further, the contents stored in the stack means must be returned to the respective registers and the program counter through the internal buses after the interruption operation is terminated.

In the conventional information processor, these saving and returning operations (overhead operations) have been necessarily performed in response to an interruption request. For example, data transmission between peripheral equipment and the CPU is performed in the interruption mode. In this data transmission operation, while the above-described program counter, status word register and other registers are not used, nevertheless the contents of these registers must be stored in the stack means. Therefore, a long overhead time is required in the prior art information processor using the interruption system. Particularly, when a common bus is employed in the CPU as the internal bus, the above-mentioned contents to be stored can not be simultaneously transferred in the stack means, so that a very long period is required for the saving and returning operations.

On the other hand, advances in semiconductor technology have made large scale integrated circuits possible. A microprocessor which has a large number of elements on a single semiconductor chip is provided, and a plurality of peripheral equipment, such as a display unit, a printer unit, a keyboard unit, a motor, may be controlled by a single microprocessor. Such a microprocessor requires an analog to digital or a digital to analog converting function, a timer function, a direct memory access function, a serial data transmission function, or the like. Therefore, a plurality of interface circuits for controlling communications between the CPU and peripheral equipment must be formed on a single semiconductor chip together with the CPU. In this connection, the microprocessor must receive many interruption requests from the peripheral equipments via interface circuits. Therefore, the above-mentioned overhead time becomes longer, and the performance of the microprocessor is further reduced.

SUMMARY OF THE INVENTION

An object of the present invention is to provide an information processor which can perform an interruption operation with less overhead.

Another object of the present invention is to provide an information processor executing a data transmission between peripheral equipment and a CPU at high speed in an interruption mode.

Still another object of the present invention is to provide a microprocessor having a semiconductor chip on which at least one interface circuit responsive to an interruption request from an external interruption source and indicating a high-speed interruption operation to a CPU is integrated together with the CPU.

An information processor of the present invention has a central processing unit (CPU) and at least one interface unit. The interface unit has a receiving circuit for receiving an interruption request from an interruption source and for generating a request signal and a mode signal to the CPU. The mode signal is used to indicate an interruption mode to the CPU. There are two interruption modes in the information processor. A first mode is a normal mode in which the CPU saves information necessary to restart an execution of a program to be stopped by the interruption in stack means before the CPU executes the interruption operation and returns the saved information after the interruption operation is terminated. A second mode is a special mode (hereinafter called a macro service mode) in which the CPU executes the interruption operation without the saving of the information which is to be saved in the stack means according to the first mode.

According to the information processor of the present invention, the interruption operation is performed according to the mode signal. Particularly, when the interruption operation is performed in the second mode, the saving of contents of a program counter, a status word register, and the other registers is not required. Therefore, the interruption operation can be executed with less overhead. Further, the returning of the contents to the program counter and the status word register is not required after the interruption operation is terminated. An interruption operation which does not require the stack operation is performed in the second mode. Data transmission between the CPU and peripheral equipment can be performed in the second mode. For example, when the information processor includes an A/D converter or a D/A converter, converted digital data or analog data to be converted is transferred between the A/D converter or the D/A converter acting as an interface unit and the CPU in the second mode. When the information processor includes a serial communication interface unit to be coupled to serial data manipulating peripheral equipment, data transmission between the serial communication interface unit and the CPU may be performed in the second mode. In this case, the data transmission in the second mode is performed in a parallel form through a data bus coupling the CPU to the serial communication interface unit. When the information processor includes a real-time output port unit as the interface unit, the CPU sets data to be outputted from the real-time output port therein in the second mode. Further, when the information processor includes an event counter unit as the interface unit, the CPU receives a content of the event counter unit which is counted up or down whenever an event occurs in peripheral equipment in the second mode in response to interruption requests generated at predetermined intervals from a timer provided in the information processor. It will be easily understood that the present invention also can be applied to another type of interrupt operations in which no stack operation for the program counter and the status word register is required. Further, in the present invention, an arithmetic logic unit (ALU) and a RAM in the CPU can be used in the second mode.

When an information processor is realized in a single chip microprocessor, an interruption request from outside the chip and an interruption request generated in the chip can be seized as the same interruption level (hereinafter referred to as I/O requests). The I/O requests are processed by either one of two modes according to the mode signal. The first mode is a conventional interruption handling mode, processing the I/O requests according to the program manipulation. In this mode, contents of the program counter, register, flag and others are saved for interruption handling. That is, overhead processing is executed. The second mode the macro service by which the data transmitting between a special function register (hereinafter called SFR) in the interface unit provided on the microprocessor chip and a memory (hereinafter called RAM) provided in CPU can be executed without performing overhead processing. When the macro service comes to end, the CPU restarts execution of the suspended program. Since overhead processing is not necessary in this case, the suspended program can be performed immediately. Accordingly, the suspension of the program is not seen as such from a software perspective and looks as if a transfer instruction were inserted automatically in the program manipulation for processing.

The macro service (the second mode) minimizes the number of interruption occurrences for which software processing is influential and thus lightens the software processing load. Accordingly, the macro service is employed for simple data transmission between buffer areas of the peripheral interface unit and the memory, which has been processed by interruption handling in the prior art. On the other hand, editing and smoothing of a series of data obtained through the macro service according to I/O requests are processed by interruption handling of the first mode as before. Therefore, the microprocessor of the present invention has further means for exchanging the second mode and the first mode. This means is effective for an interruption operation including data transmission and data handling according to a program.

BRIEF DESCRIPTION OF THE DRAWINGS

FIGS. 9, 10, 11, 12, 13, 14, 15 and 16 are block diagrams of other embodiments of the present invention, respectively.

DETAILED DESCRIPTION OF THE PREFERRED EMBODIMENTS

Figure 1:
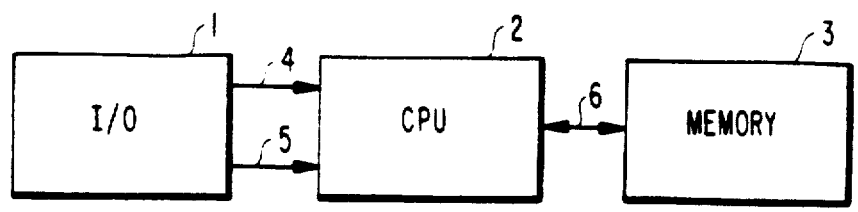
FIG. 1 is a block diagram representing one embodiment of this invention.

FIG. 1 is a block diagram of the processing environment to which the present invention is applicable. The embodiment comprises an I/O request control section 1 for controlling an interruption request from peripheral and other types of equipment, an execution section 2 for carrying out processing according to a program and the interruption request, and a memory section 3. An interruption request signal is applied to the execution section 2, through a line 4. A mode signal is applied also to the execution section 2 for designating a mode of the interruption through a line 5. The execution section 2 and the memory section 3 are coupled to each other by an internal bus 6. When I/O requests from peripheral equipment are generated and the I/O request line 4 comes to an active level, the execution section 2 suspends a program which is now being performed and accepts the I/O requests. The execution section (CPU) 2 checks a level of the I/O mode designating line 5. In the example, if the I/O designating line 5 is on a low level, the I/O request is received as a normal interruption request (the first mode), while if it is on a high level, then the request is received as a macro service.

Figure 2:
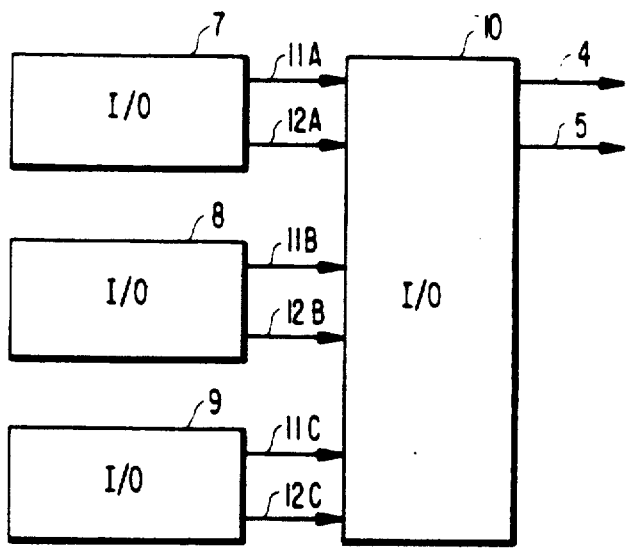
FIG. 2 is a block diagram representing the I/O request control section 1 in FIG. 1.

Next, FIG. 2 is a block diagram of the I/O request control section (an interface unit) 1 in FIG. 1, and its operation will be described with reference thereto. Here, three I/O request sources A, B, C are taken up for description. The I/O request control section 1 has I/O request generation circuits 7, 8, 9 for generating I/O requests according to the I/O request sources A, B, and C, respectively, I/O request lines 11A, 11B and 11C transfer I/O requests. I/O mode designating lines 12A, 12B and 12C transfer mode signals. Further, the control section 1 has a circuit 10 for detecting a priority level for the received I/O request signals and for indicating an interruption to the CPU 2. Thus, the I/O source with the highest priority level is selected and the I/O request signal corresponding to the selected source and the mode signal is transferred to the CPU 2 through the lines 4 and 5, respectively. Here, if the interruption operation is performed in the first mode, the I/O request source turns I/O mode designating line 12 to a low level. On the other hand, if the interruption is performed in the second mode, then it turns the designating line 12 to a high level. It is assumed that the priority level of I/O request lines 11A, 11B, 11C are given in precedence 11A>11B>11C.

Figure 3:
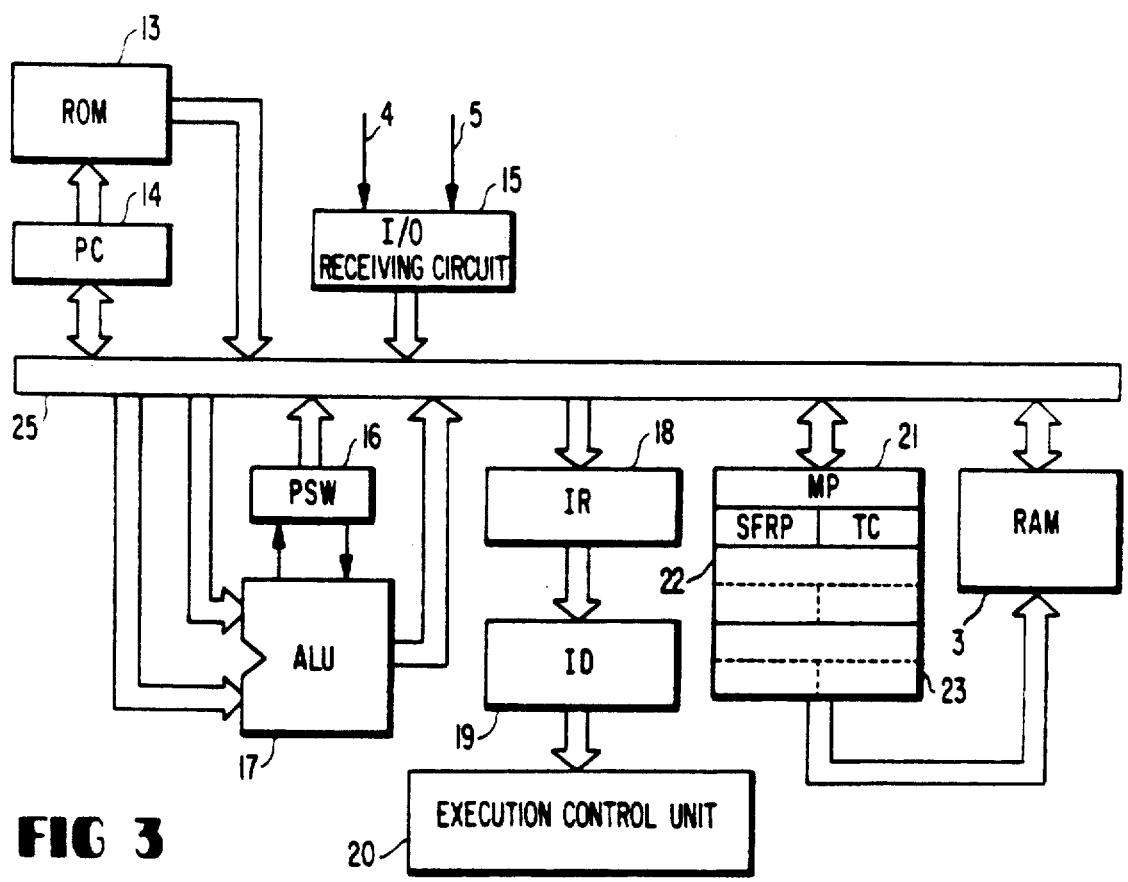
FIG. 3 is a block diagram representing the execution section 2 in detail and the memory 3 in FIG. 1.

Next, FIG. 3 represents the CPU 2 and the memory 3 in FIG. 1 in detail, and their operation will be described with reference thereto. The I/O request line 4 and the I/O mode designating line 5 of the I/O request control section in FIG. 1 are coupled to an I/O receiving circuit 15. Interruption programs according to I/O requests are loaded in a program memory (ROM) 13 wherein microprograms are preliminarily stored, and the access is effected on a program counter (PC) 14. A general operation status of the CPU 2 is set in a program status word register (PSW) 16. The CPU further comprises an arithmetic logical operation unit (ALU) 17 having an arithmetic logical operation function, an instruction register (IR) 18 holding an instruction word read out of the ROM 13, an instruction decoder (ID) 19 for generating various control signals according to contents of the instruction register 18, and an execution control unit 20 for controlling operations of the CPU according to an output of the instruction decoder 19. The CPU has memory points (hereinafter called MP) each capable of pointing addresses of the RAM 3, special function register points (hereinafter called SFRP) capable of pointing SFR addresses in an interface unit (not shown), and terminal counts (hereinafter called TC) for storing the number of times macro service is implemented. Three registers groups 21, 22, 23, each of which has MP, SFRP and TC, are prepared for macro services. Contents of the MP, SFRP and TC can be set therein according to software instructions.

Normally in the CPU, an instruction stored in the ROM 13 is read out according to the program counter 14 and is transferred to the instruction register 18, the instruction transferred to the instruction register 18 is decoded in the instruction decoder 19, and the execution control unit 20 generates various control signals according to the decoding result, thus executing the program. Then, every time an instruction is executed, a value of the program counter 14 is updated to access the next sequential instruction required to execute the program.

Here, when the I/O receiving circuit 15 detects that the I/O request line 4 takes an active level, program execution is to be suspended, and the level of the I/O mode designating line 5 is sampled. If the level of the line 5 is low, then the I/O receiving circuit 15 recognizes that the request is a normal interruption mode (the first mode). Under such state, contents of the program counter 14 and contents of the program status word register 16 are saved at locations in the RAM 3 designated by a stack pointer (not shown), and thereafter a leading address necessary for the interruption is set in the program counter 14. Thus the normal interruption handling program is commenced. When the interruption handling program is terminated, the contents saved in the RAM 3 are returned to the program counter 14 and the program status word register 16, respectively. Thus, in this first interruption mode, overhead operations are required.

On the other hand, if the I/O mode designating line 5 is at a high level, the I/O receiving circuit 15 recognizes that the request is the macro service, and refers to the register group corresponding to the accepted I/O source on the basis of a vector (described hereinafter) which is sent from an interface unit. At this time, contents of the program counter 14 and the program status word register 16 are not saved in the RAM 3 and are held as they are. Here, the register group 21 corresponds to the I/O source A, the register group 22 corresponds to the I/O source B, and the register group 23 corresponds to the I/O source C. If the I/O source A has the highest priority and its mode signal is of high level, the reference is made to the register group 21. In this case, the execution control circuit 20 transfers contents of the address pointed by MP to an address pointed by SFRP or contents of the address pointed by SFRP to an address pointed by MF through the bus 25. This can be effected by a control similar to the normal transmission instruction execution. Accordingly, the stack operation will never be performed during the macro service. Then, according to the macro service a value of MP is incremented by 1 in the ALU 17 and is loaded in MP, while a value of TC is decremented by 1 in the ALU 17 and is loaded in TC, thus closing a series of macro service. However, when the TC value becomes 0, the interface unit corresponding to the I/O request source A is controlled to generate the first mode interruption request signal. As a result, the first mode interruption is generated from the interface circuit of the source A just after the macro service is terminated. Thus, the interruption handling is actuated consecutively to process the data transferred by the macro service on a normal interruption handling program.

Figure 4:
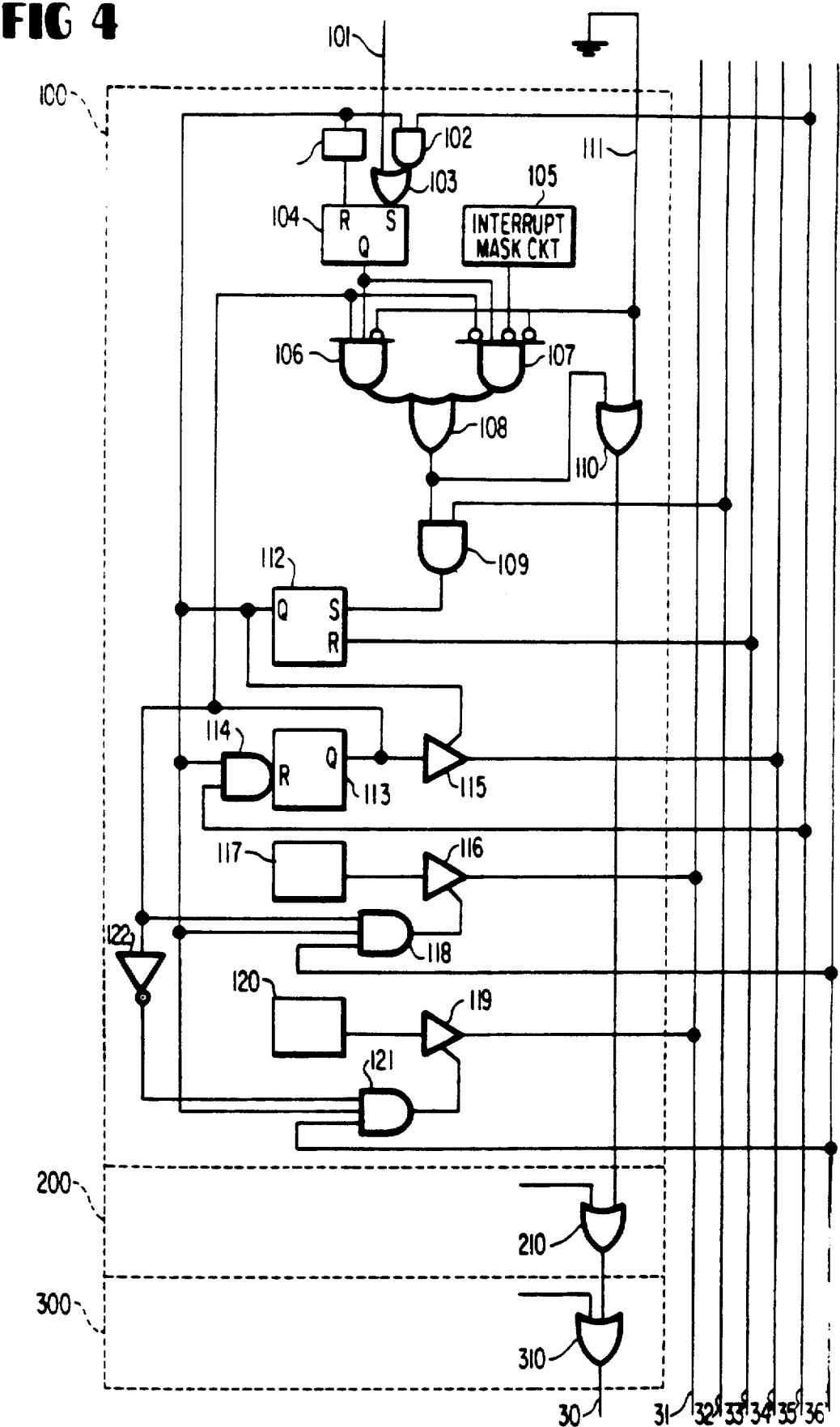
FIG. 4 is a logical drawing of the I/O request generation circuits 7, 8, 9 and the priority control circuit 10.

Next, FIG. 4 represents a detailed logical circuit diagram of the I/O request circuits 7, 8, 9 and the priority control circuit 10. A control circuit 100 acts as an interface unit and includes the I/O request circuit 7 and a portion of the priority control circuit 10 in FIG. 2. Control circuits 200 and 300 act as another interface circuits, and include the I/O request circuits 8 and 9 and the other part of the priority control circuit 10, respectively. Since these three control (interface) circuits operate exactly in the same way, the control circuit 100 will be taken up here for description. The control circuit 100 comprises an I/O request flip-flop (hereinafter called I/O RQF/F) 104 which is a set/reset flip-flop (hereinafter called RSF/F) for receiving the interruption signal from the source A, an interruption mask circuit 105 for masking the received interruption signal, a condition flag 112 for indicating an interruption condition, a mode F/F 113 which is a RSF/F for indicating the macro service state, a register 117 for storing information to be used in the macro service, a register 120 for storing a vector to be used in normal interruption (the first mode). An I/O mode designating line 34, an information line 31, an acknowledgement line 32, a reset line 33, a macro service inhibit line 35 and a read control line 36 are coupled to each control circuit to the CPU. A request line 101 from the I/O request source is coupled to I/O RQF/F 104, and when the request line 101 takes a high level, I/O RQF/F 104 is set through an OR gate 103. The interruption mask circuit 105 and the mode F/F 113 are ready for setting and resetting by programs, the interruption mask circuit 105 is set when the interruption request is forbidden, and the mode F/F 113 is set in response to the mode signal 12 in FIG. 2.

Here, a description will be given of an operation when the request line 101 from the I/O request source takes a high level, and the I/O RQF/F 104 is set accordingly under the condition wherein the interruption mask circuit 105 is reset and the mode F/F 113 is reset. Since an output of the mode F/F 113 is of low level, a control input 111 for controlling the priority is of low level, and an output of I/O RQF/F 104 and an output of the interruption mask circuit 105 are both of low level, an output of an AND gate 107 takes a high level, and outputs of OR gates 108 and 110 takes a high level. An output of the OR gate 110 is coupled to an OR gate 210, and an output of the OR gate 210 is coupled to an OR gate 310, therefore an I/O processing request line 30 becomes a high level according to an output status of the OR gate 108. When the situation that the I/O processing request line 30 has become a high level is detected, the CPU 2 stops the program which currently is being executed. This line 30 is used to indicate reception of the I/O request to the CPU. The acknowledge signal (hereinafter called I/O ACK signal) is transferred from the CPU through the line 32. In response to this ACK signal, the condition F/F (hereinafter called CF/F) 112 is set through an AND gate 109. If the I/O request is generated in the other control circuits 200 and 300 in this case, since outputs of the OR gates 110 and 210 are of high level, outputs of OR gates in the control circuits 200 and 300 corresponding to the OR gate 108 in the control circuit 100 will never become high level, and the CF/F in the control circuits 200 and 300 is never set. That is, for each control circuit, CF/F is a flip-flop whereby the I/O request is accepted when the I/O request source higher in priority than the I/O request for that control circuit has not generated the I/O request. When CF/F 112 is set, a leading edge is detected by a leading edge detection circuit 119 to which an output of CF/F 112 is coupled, I/O RQF/F 104 is reset to provide for the next I/O request acceptance. Then, a tri-state buffer 115 is made active, and content of the mode F/F 113 is outputted to the mode designating line 34. In this case, since a low level on the mode designating line 34 is detected, the CPU recognizes the first mode, that is the normal interruption, and thus commences the stack operation for the program counter and the program status word register. After commencing the stack operation, the CPU transfers the vector read signal to the line 36 for finding a leading address of the interruption program to be processed. Since the CF/F is of a high level and the mode F/F is of a low level, an output of inverter gate 122 takes a high level. Therefore, an output of AND gate 121 takes a high level, and the tri-state buffer 119 becomes active. Accordingly, vector information of the register 120 is outputted to a bus 31 and is sent to the CPU. In this case an output of AND gate 118 does not take a high level for the mode F/F being a low lever, and a tri-state buffer 116 does not become active. The vector data on the bus 31 is received to the CPU and a branch operation to jump the interruption program is performed. Further, a signal (hereinafter called EOP signal) 33 indicating that the I/O request processing is over is turned to a high level to reset CF/F 112. When the interruption handling program is terminated, contents stored in the RAM 3 are returned to the program counter, program status word register and others, thus recommencing the suspended program execution.

Described next is an operation to cope with the situation in which the I/O request is generated and the I/O RQF/F 104 is set when the mode F/F 113 is set. In this case, an output of I/O RQF/F 104 and an output of the mode F/F 113 are of high level, and the control input 111 for priority is of low level, therefore an output of AND gate 106 takes a high level, and outputs of the OR gates 108 and 110 take a high level. The output of the OR gate 110 is coupled to an input of the OR gate 210, and an output of the OR gate 210 is coupled to an input of the OR gate 310, therefore the I/O request line 30 becomes a high level unconditionally. When the high level of the I/O request line 30 is detected, the CPU suspends program execution, outputs the I/O ACK signal 32, sets CF/F 112 through the AND gate 108, and resets I/O RQF/F 104 on an output of the leading edge detector 119 to which an output of CF/F 112 is coupled. Then, the output of CF/F 112 makes the tri-state buffer 115 active and outputs a content of the mode F/F 113 to the mode designating line 34. Since a high level of the I/O designating line 34 is sampled, the CPU recognizes that a macro service will be effected. Then, to obtain the necessary information for macro service, the CPU transfers the vector read signal 36 to a high level, the AND gate 118 to a high level and the tri-state buffer 116 active, and outputs information of the register 117 holding information necessary for the macro service to the bus 31. The information outputted to the bus 31 in this case includes register group selection information indicating which register group to select, and information designating the direction of automatic data transmission, namely the transmission from SFR to RAM or from RAM to SFR. The CPU refers to one of the register groups 21 and 23 according to information obtained through the bus 31. Thus, data transmission between the CPU and peripheral equipment corresponding to the inhibit 100 is performed by using the bus 21. In the macro service, at every data transmission, addition and subtraction are carried out by 1 each on MP and TC, respectively, and where the subtraction results in TC=0, the CPU inhibits the macro service, turns the signal 35 to a high level, and effects a hard reset of the mode F/F 113. Further, since an output of CF/F 112 is of high level, I/O RQF/F 104 is set through the AND gate 102 and the OR gate 103 by turning the inhibit signal 35 to a high level. The CPU then turns EOP signal 33 to a high level and resets CF/F 112, thus closing a series of macro service. However, since the mode F/F 113 is reset and I/O RQF/F 104 is set here, a normal interruption request (the first mode) is generated, and interruption for the transferred data is actuated consequently. Therefore, the normal interruption program is sequentially executed according to data transferred through the macro service.

The above-described embodiment will be described next according to a practical application. If an A/D converter is taken up for the interface unit, then the I/O request will be generated when an A/D conversion operation comes to an end. Some sampling values averaged through arithmetic operation will be employed normally for A/D conversion value. Accordingly, the number of data to be averaged on TC is set, an address in which a result of the A/D conversion value is loaded is set on SFRP, a proper buffer area is set on the memory pointer, the mode F/F 113 is set, the interruption mask circuit 105 is reset, the direction of data transmission is designated in the form of SFR to RAM to the information in the register 117, and then A/D conversion is commenced. Thus the A/D conversion value is automatically loaded in the buffer area at the end of every A/D conversion, and an interruption is generated when the operation wherein 1 is added on MP and 1 is subtracted on TC is carried out by the number of times specified to TC. Accordingly, in the interruption handling program, the number of times for interruption generation will be largely decreased simply by averaging of data loaded in the buffer area and resetting of MP and TC, thus enhancing program execution efficiency.

Further, in this embodiment, an operation of the CPU is not completely stopped for control of the macro service, but the CPU itself operates for the transmission, therefore the hardware for control of the instruction execution at the time of normal program manipulation will be utilized effectively without requiring any special hardware for macro service. Then in the embodiment, an example fixed in precedence is given for description, however, a processing request control variable in precedence can easily be satisfied. A data transmission only is taken up for the processing, however, an information processor exceedingly rich in flexibility will be obtainable for high application through combining a control of normal compare instruction and the like therewith without adding any special additional hardware thereto.

The present invention is effective for various interface units. An example of application of the principles of the present invention to an A/D converter interface unit now will be described.

Figure 5:
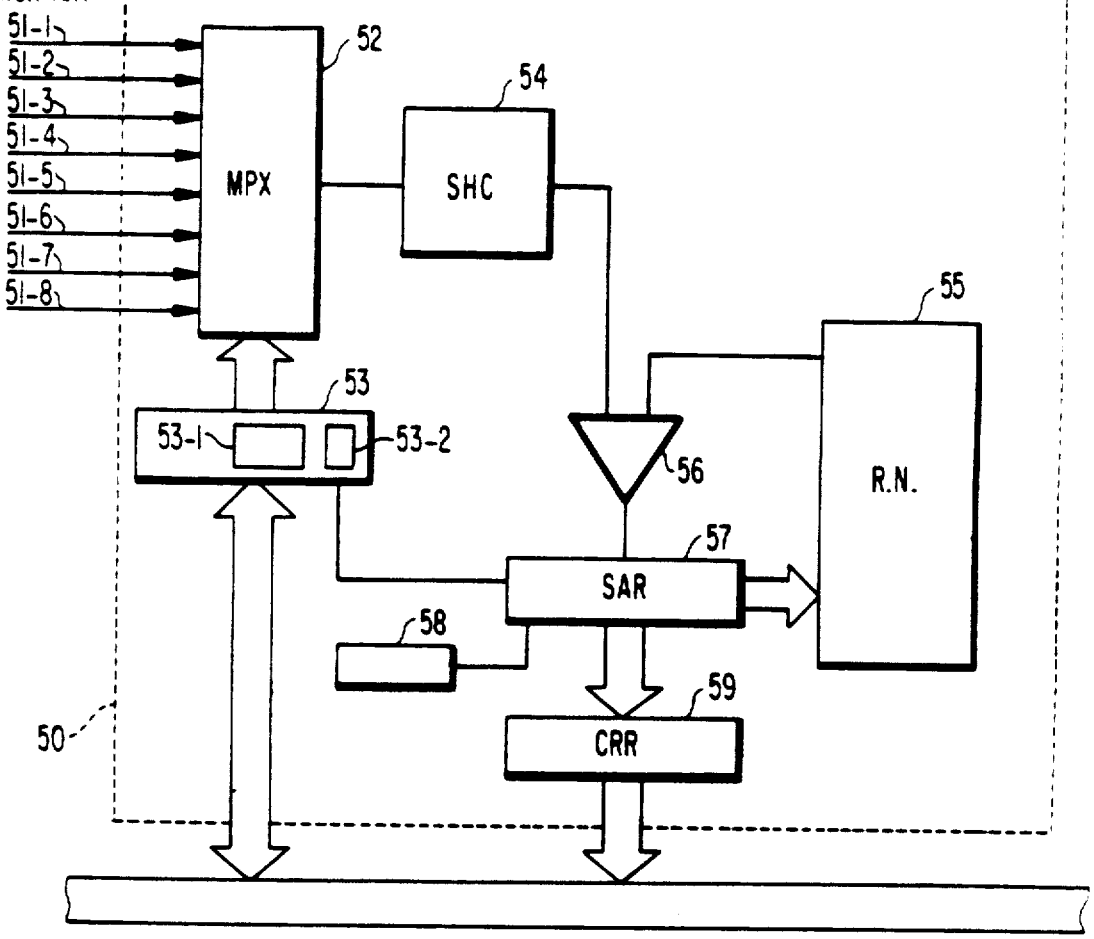
FIG. 5 is a block diagram of a conventional A/D converter.

An example of analog data processing on a conventional A/D converter in such a background will be described with reference to a block diagram of FIG. 5.

An A/D converter 50 comprises analog inputs 51-1 to 51-8, a multiplexer (MPX) 52, an A/D channel mode register 53 having a channel designating bit 53-1 and an A/D conversion complete flag 53-2, a sample and hold circuit (SHC) 54, a ladder resistance network (RN) 55, a voltage comparator 56, a successive approximation register (hereinafter called SAR) 57, a controller 58, a conversion result register (hereinafter called CRR) 59. The A/D converter 50 may, for example, derive an 8-bit A/D conversion value through a successive approximation process.

First, the CPU writes a value in the channel designating bit 53-1 of the A/D channel mode register 53. The A/D conversion complete flag 53-2 is then reset simultaneously. The analog input 51-1 selected through designation of the A/D channel mode register 53 is sampled in the sample hold circuit 54, whose output is provided as one input of the voltage comparator 56. The voltage comparator 56 sets corresponding digital data in SAR 57 from an upper bit according to a difference between the analog input and a voltage tap selected successively by a tap decoder of the ladder resistance network 55. That is, one bit of the digital data is set through comparison carried out one time on the voltage comparator 56, and the 8-bit A/D conversion value is set in SAR 57 to the one analog input 51-1 by repeating the comparison operation. The result is latch-inputted to CRR 59, and the A/D conversion complete flag 53-2 of the A/D channel mode register 53 is set simultaneously. In response to an A/D conversion command, the CPU checks the A/D conversion complete flag 53-2 at all times during operation of the A/D converter 50 for data conversion, and must wait for the A/D conversion complete flag to be set. At the point in time where the A/D conversion complete flag is set securely, the CPU reads the A/D conversion value held in CRR 59 and loads that value in the memory.

Thus the microcomputer incorporating the conventional A/D converter therein must monitor an end of conversion at all times during A/D conversion. However, as a result essential processing ordinarily performed by a main processing CPU cannot be performed all the time through, and thus execution efficiency is not satisfactory.

Figure 6:
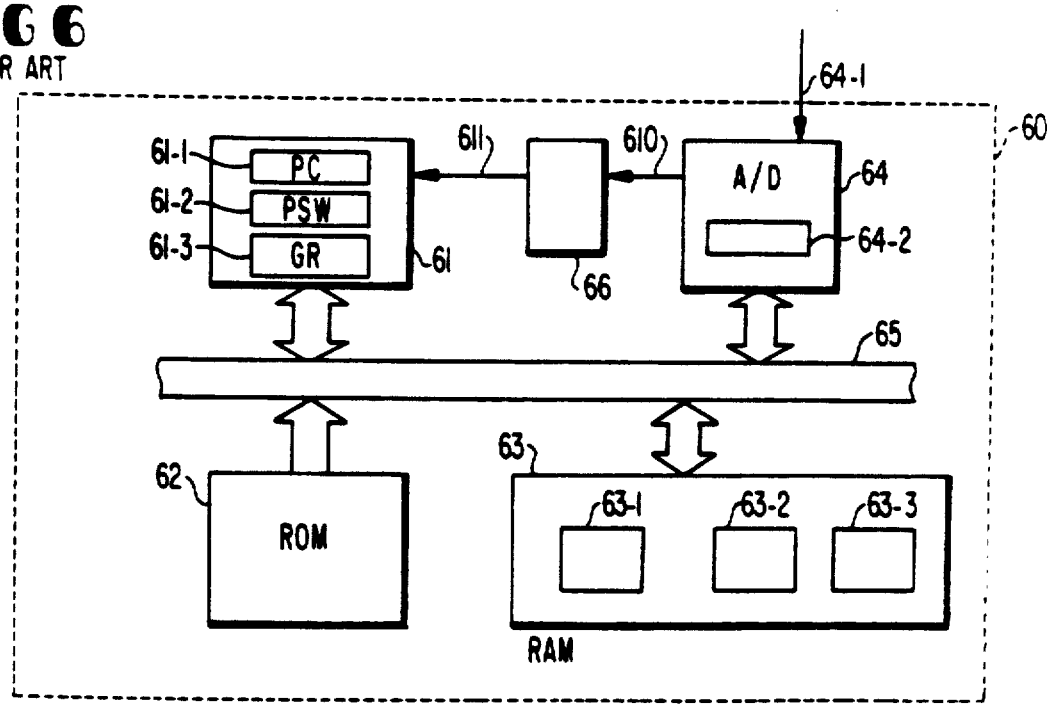
FIG. 6 is a block diagram representing schematically an example of microcomputer incorporating an A/D converter therein.

To improve the above defect, there is a method wherein an interruption request is generated in the CPU whenever a conversion value is loaded in CRR 59 without using the conversion complete flag 53-2. The method will be described with reference to a block diagram of FIG. 6 and a flowchart of FIG. 7. A microcomputer 60 comprises an execution circuit 61, a program memory (ROM) 62, a data memory (RAM) 63, and A/D converter 64 and an A/D interruption control circuit 66, all of which are coupled mutually through an internal bus 65. The execution circuit 61 comprises a program counter (hereinafter called PC) 61-1, a program status word (hereinafter called PSW) 61-2, a general purpose register set (GR) 61-3. The execution circuit 61 executes a program according to an instruction code read out of the program memory 62, and loads processing data in the data memory (RAM) 63. The A/D converter 64 has a CRR 64-2 for one byte, processes an analog input 64-1 to A/D conversion, and upon loading it in CRR 64-2, makes a conversion complete signal 610 active, and then advises the A/D interruption control circuit 66 of the conversion having been completed. The A/D interruption control circuit 66 then makes an interruption request line 611 active, advises the execution circuit 61 of an A/D interruption request having been generated, and thus the execution circuit 61 executes A/D interruption handling.

Figure 7:
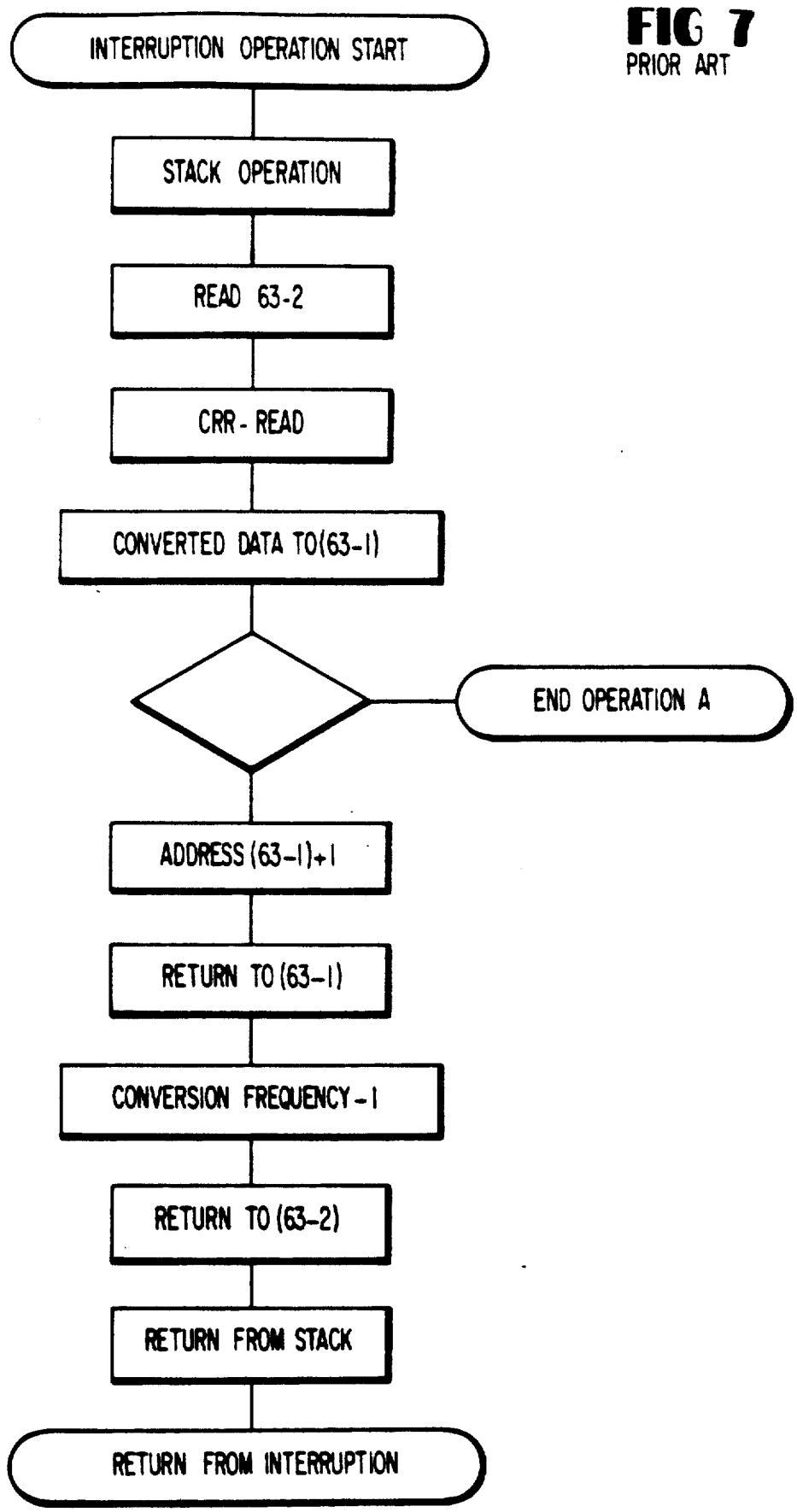
FIG. 7 is a flowchart of conversion processing according to what is shown in FIG. 6.

Now, a software processing procedure according to A/D interruption will be described with reference to the flowchart of FIG. 7. In the software processing, a conversion value loading area 63-1 is set in the data memory 63, and address information for designating the conversion value loading area 63-1 and a conversion frequency information are set beforehand in conversion parameter shunt area 63-2 in the data memory 63.

When advised of a conversion having been completed, the execution circuit 61 executes a conversion interruption handling. First, in order to retain the current processing status the contents of each of the PC 61-1, PSW 61-2 and the general purpose register set 61-3 are set aside to a separate area prepared temporarily as a stack area 63-3. Next, an address of the conversion value loading area 63-1 is read out of the conversion parameter shunt area 63-2 and loaded in a pointer. A conversion value is then read out of CRR 64-2 and loaded in the conversion value loading area 63-1 designated by the pointer. When the conversion reaches a predetermined number of times, a series of data conversion is regarded as having been completed and so the operation branches to a conversion procedure complete processing A. If the conversion has not reached the predetermined number of times, the address information of the conversion value loading area 63-1 and the conversion frequency data area are updated and returned to the conversion parameter shunt area 63-2. Then, the contents of each of the PC 61-1, PSW 61-2 and the general purpose register set 61-3 which were set aside in the stack area 63-3 are returned to the original position, thus completing the conversion interruption service.

As described above, in the software processing according to interruption on the conventional microcomputer, many processings (overhead) such as interruption handling on CPU, stack operations for PC, PSW and general purpose register set to a stack register (a part of RAM), return operation from the stack register, and a return operation to a main routine are required other than transmission of the A/D conversion value. The overhead then comprises a considerable extent of an overall interruption service routine, and hence the method is also ineffective to decrease an execution time which can be assigned to the main processing and thus CPU throughput is degraded.

There may be conceivable, on the other hand, a buffering technique wherein a register equivalent to CRR 59 is incorporated plurally in parallel, and an interruption request is generated at the point in time when the A/D conversion value is loaded in all the CRRs. According to the technique, a frequency of interruption generation is decreased to 1/n by increasing the number of CRRs to n, therefore a ratio of the overhead taken up by interruption is decreased, and thus an execution efficiency of the CPU can be enhanced for certain. However, an increase in the number of CRRs to be provided as buffers inevitably increases the chip area of the microcomputer.

In an information processor provided with a conversion unit (an interface unit) for generating a conversion data and a conversion complete signal according to a closing of A/D conversion, a CPU for performing a normal program manipulation and data transmission according to the conversion complete signal, and a memory for storing a processing data and a program, the embodiment is characterized in that the CPU is provided with an A/D conversion data processing control means for realizing an execution of an A/D conversion data transmission as holding a state on the way to the normal program processing, and when the A/D conversion unit generates the conversion complete signal, the CPU suspends the normal program manipulation under control of the A/D conversion data processing control means and executes the A/D conversion data transmission.

According to this aspect of the present invention, processing according to an I/O request of A/D conversion completion, namely data transmission between CRR and the data memory, can be executed without interposition of a program manipulation (software). The data transmission (hereinafter called automatic data transmission) is that in which CPU suspends execution of a program manipulation when an I/O request according to A/D conversion completion is generated, and the CPU itself performs the macro service.

Figure 8:
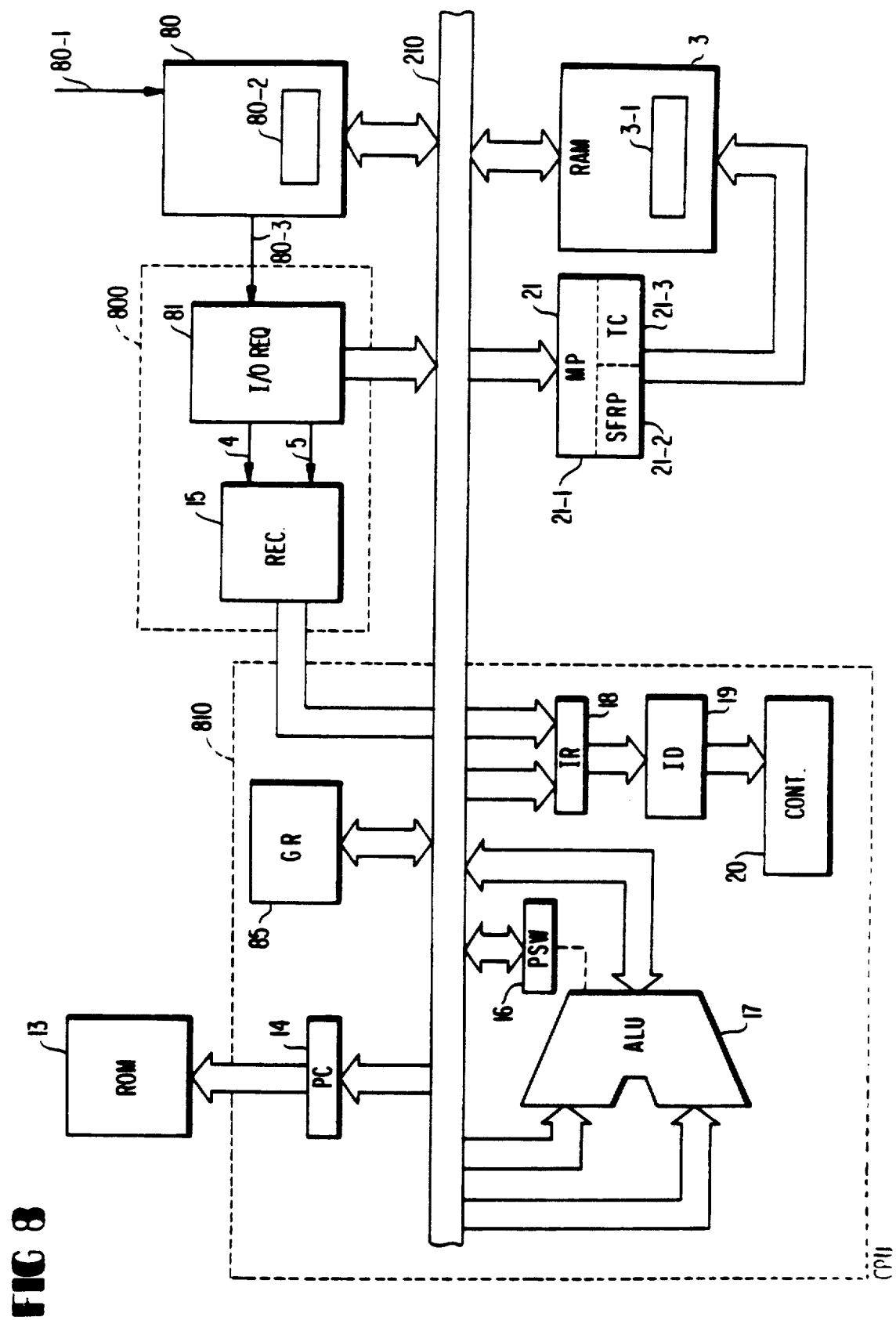
FIG. 8 is a block diagram representing in detail a microcomputer having a macro service data transmission function in accordance with an embodiment of this invention.

FIG. 8 shows an embodiment of the microprocessor in FIG. 1 which includes an A/D conversion interface unit. An A/D converter 80 has a CRR 80-2 and outputs an A/D conversion complete signal 80-3 to an I/O request control circuit 81. An A/D conversion interface unit 800 has the I/O request control circuit 81, an I/O request line 4 and an I/O mode designating line 5 coming therefrom, and the I/O request receiving circuit 15 for controlling an operation of CPU 810. On the other hand, the memory comprises a program memory (ROM) 13 for storing the interruption handling program and other programs and a data memory (RAM) 3 having an A/D conversion data loading area 3-1. Further, the CPU 810 comprises a program counter (PC) 14 for pointing an address of the instruction to execute next, an arithmetic logical operation unit (hereinafter called ALU) 17, PSW 16 for indicating a general operating state of the CPU, a general purpose register set (GR) 85 for holding a data in processing, an instruction register 18 for holding the instruction to execute next, an instruction decoder 19 for interpreting contents of the instruction register 18 and generating various control signals, and an execution control unit 20 for controlling a general operation of the CPU according to an output of the instruction decoder 19. Then, the register 21 necessary for performing the macro service is provided. The register 21 comprises a memory pointer (hereinafter called MP) 21-1 for designating an address of the data memory, an SFR pointer (hereinafter called SFRP) 21-2 for designating an address of the special register and, a terminal counter (hereinafter called TC) 21-3 for holding a transmission frequency of the A/D conversion value automatic data transmission. All the above function elements are coupled to an internal bus 210.

An operation of the macro service in A/D conversion data processing will be described. When the analog input 80-1 is sampled on the A/D converter 80, and the sampled A/D conversion value is loaded in CRR 80-2, and the A/D conversion complete signal 80-3 is outputted to the I/O request control circuit 81. The I/O request control circuit 81 then sends a signal through the I/O request line 4 and the I/O mode designating line 5 which are coupled to the I/O request receiving circuit 15. When the I/O request line 4 is activated, and the mode line 5 takes a low level, then the I/O request is recognized as the first mode. On the other hand, when the mode line 5 is at a high level, the circuit 15 recognizes the I/O request as the macro service (the second mode) and sets appropriate information in the instruction register 18. The execution control unit 20 forbids updating of PC 14 and commences the following processing without saving contents of PC 14, PSW 16 and general purpose register set 85. First, the I/O request control circuit 81 outputs information corresponding to an address of the register 21 onto the internal bus 210, and the execution control unit 20 reads the address of the register group 21. Next, the execution control unit 20 reads an A/D conversion value out of CRR 80-2 pointed by SFRP 21-2 of the register 21, loads the data in the A/D conversion value loading area 3-1 of the data memory 3 pointed by MP 21-1, subtracts a value of TC 21-3 by 1 and loads it again in TC 21-3. A series of the above processing constitutes one complete sequence of macro service for A/D conversion value transmission. A series of data transmission is regarded as completed when a value of TC 21-3 becomes 0 through subtraction, and after the current A/D conversion value is loaded in the A/D conversion value loading area 3-1, the I/O request control circuit 81, makes the I/O request line 4 active again and, turns the I/O mode designating line 5 to a low level to generate an A/D conversion interruption request, thus activating the A/D conversion interruption program.

As described above, the invention comprises two kinds of modes, normal software interruption (first mode) and the macro service (second mode), to cope with a conversion complete signal generated according to a closing of A/D conversion, which can be selected properly. Particularly at the time of the macro service mode, the time required for saving of PC 14, PSW 16 and general purpose register 85 which are necessary for conventional interruption handling, branch processing to the interruption program, return to the register, reading of instructions, decoding and the like can remarkably be saved, and a deterioration in throughput of CPU can be prevented as much as possible.

Figure 9:
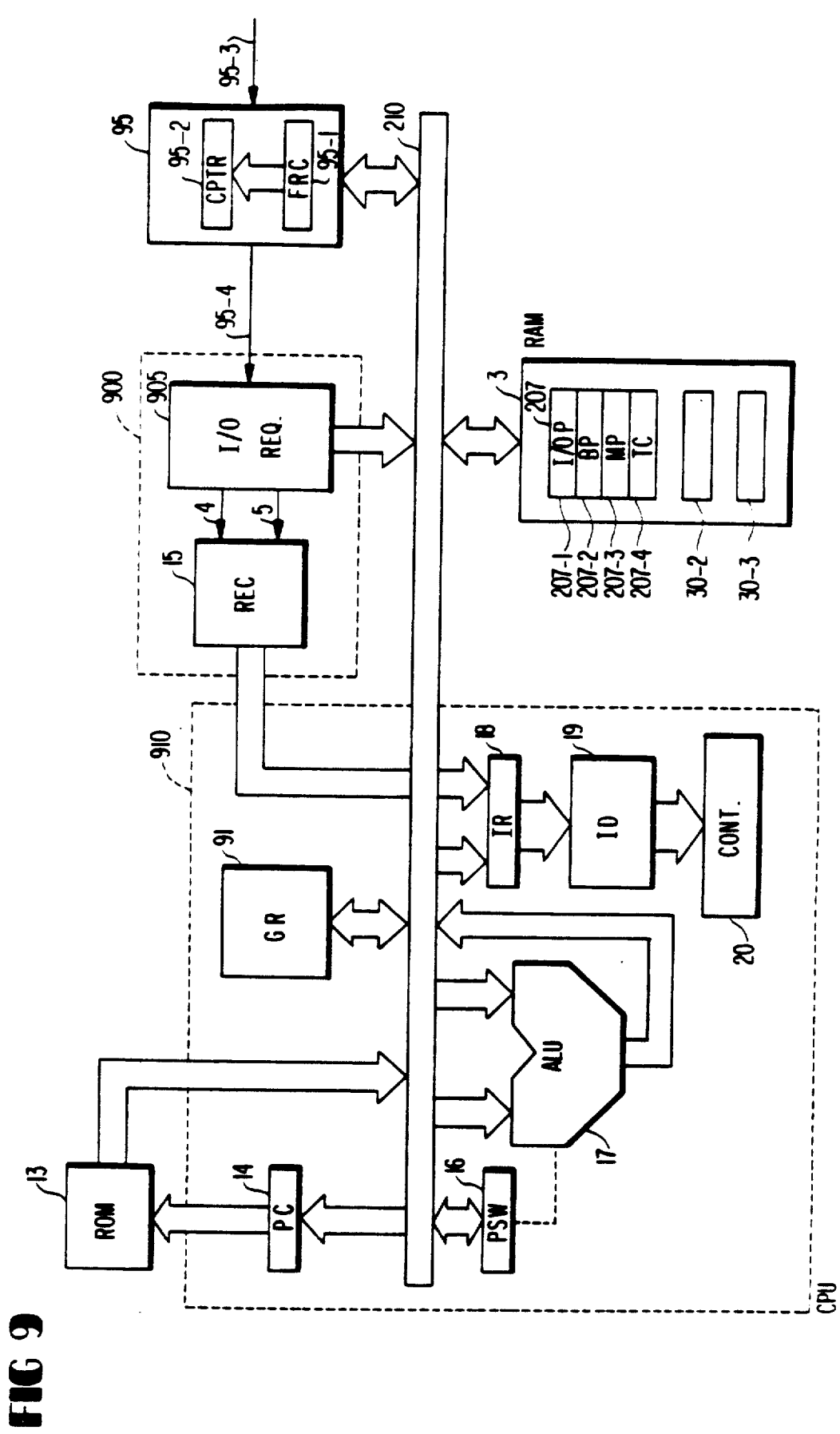

Another embodiment of the present invention is shown in FIG. 9 in which a counter function is provided to measure a period and width of a pulse generated from peripheral equipment, for example, of the rotational frequency and speed of a motor, which is integrated as one function in a microcomputer chip. For measurement of period and width of a pulse, a counter 95 comprising a counter (hereinafter called free running counter 95-1 (FRC)) for counting a predetermined counting clock and a capture register 95-2 (hereinafter called CPTR) for holding count data temporarily is used generally in a microcomputer. When a pulse signal 95-3 is sent from the object being measured, the counter in such configuration loads a value indicating the current counting state of the FRC 95-1 in CPTR 95-2 (the operation being called capturing hereinafter), and continues a counting operation of FRC until the next pulse signal is inputted. When the next pulse signal is inputted, it captures the then current value of FRC. CPTR then holds the captured data as before. To obtain the width and period of the pulse, the data loaded previously in the CPTR 95-2 is set aside to another register temporarily, and a difference from the data captured before will be obtained when the next FRC value is captured.

Then, for highly precise control, a measure over noises or an optimum control must be taken into consideration. Accordingly, there is employed a technique wherein a presence of capture generation due to noises and a degree of acceleration or deceleration are obtained through comparing information of width and period of a pulse obtained from the data captured previously with newly obtained information, or an average is obtained from data captured more than one time, thereby carrying out various controls.

In FIG. 9, a counter 95 has FRC 95-1 and CPTR 95-2, and when a value of FRC 95-1 is captured in response to the capture command signal 95-3, the capture end signal 95-4 is outputted. A count data processing control unit 900 has an I/O request control circuit 905, an I/O processing request line 4, and I/O mode designating line 5, and an I/O request receiving circuit 15 for controlling an operation of a CPU 910. Then, the data memory (RAM) 3 has an arithmetic operation result loading area 30-2, the stack area 30-3 in which the status is saved. The CPU 910 comprises a PC 14 for pointing an address of the program memory 13, a PSW 16 for indicating a general operating state of CPU, a general purpose register set 91 for holding data in processing, an ALU 17, an instruction register 18 for holding the instruction to execute next, an instruction decoder 19 for interpreting a content of the instruction register 18 and generating various control signals, and an execution control unit 20 for controlling a general operation of CPU 910 on an output of the instruction decoder 19. Further, a macro service register group 207 necessary for the macro service is provided on a part of the data memory 3. The macro service register group 207 comprises a pointer (hereinafter called I/O P) 207-1 for designating an address of the capture register, a pointer (hereinafter called BP) 207-2 for designating an address of the data memory holding the data captured previously, a memory pointer (MP) 207-3 for designating an address of the arithmetic operation result loading area 30-2 in which a subtraction result of two elements of capture data is loaded, and a terminal counter (TC) 207-4 for holding a capture frequency. All of the above-described elements are connected to the internal bus 210.

An operation of the macro service in count data processing now will be described. When an active signal is inputted on the capture command line 95-3, the counter 95 captures the then current value of FRC 95-1 in CPTR 95-2 and outputs the capture end signal 95-4. The I/O request control circuit 905 then turns the I/O request processing request line 4 to the I/O receiving circuit 15 to an active level and also turns the I/O mode designating line 5 to a high level.

Upon detection of the I/O mode designating line 5 being of a high level when the I/O request line 4 becomes active, the I/O receiving circuit 15 sets a macro service code in the instruction register 18 so as to process the I/O request on macro service. The execution control unit 20 forbids updating of PC 14 and commences the following processings as holding contents of PC 14, PSW 16 and the general purpose register set 91.

First, the I/O request control unit 20 outputs an address of the macro service register group 207 onto the internal bus 210, and the execution control unit 20 reads the address of the macro service register 207. Next, the execution control unit 20 reads capture data out of CPTR 95-2 designated by I/O P 207-1 of the macro service register 207. Then, the execution control unit 20 reads the value captured previously out of the memory of the address designated by BP 207-2 of the macro service register 207 and subtracts the value captured previously from the current value of CPTR. The subtraction result is loaded in the arithmetic operation result loading area 30-2 in the data memory 3 designated by MP 207-3, and the read value of CPTR 95-2 is loaded in the memory of the address designated by BP 207-2. Next, TC 20-4 is decreased and loaded in TC 207-4, a value of the memory pointer MP for designating the address where an arithmetic operation result is loaded is increased and loaded in MP 207-3. A series of the above-described operations constitutes one operation of processing of capture data subtraction and transmission in the macro service. However, similarly to the other embodiments when the value of TC 207-4 becomes 0 as the result of subtraction, a series of the macro service is regarded as having been completed, and the I/O request control circuit 905 makes the I/O processing execution request line 4 active again and also turns the I/O processing execution mode designating line 5 to a low level so as to generate a conventional interruption request. The I/O receiving circuit 15 then activates the interruption service program and performs software processing for averaging a series of data obtained through execution of the macro service.

As described above, in this embodiment, the capture data is automatically subtracted and transferred according to the macro service when a capture end signal is generated, thus the time spent on shunt and return of PC 14, PSW 16 and the general purpose register set 91, branch processing to an interruption program, read of instructions, decoding and the like which are unavoidable in the conventional interruption service routine requiring a software processing can sharply be saved, thereby minimizing a deterioration in throughput of the CPU.

In an information processing system with a data processor (microcomputer) working as a control system therefor, there are required processings for outputting pattern information regularly and sequentially such as pattern generation of, for example, a dot character synchronized with a dot position signal in a dot printer, generation of a motor driving pattern at every stepping time in step motor driving, output of a display segment information in dynamic display control of a fluorescent display tube, light emitting diode or the like. These processings are generally executed in an interruption mode.

Another preferred embodiment of this invention will now be described with reference to FIG. 10.

The information processor comprises an I/O request processing control circuit 1000 working as an input part of the output synchronizing signal 1003 of a pattern information, the CPU 1000 comprising the program counter 14, the program status word register 16, the general purpose register set 105 and the ALU 17, the program 13, the data memory 3 comprising the pattern output parameter saving area 3-10 and the output pattern loading area 3-20, which are coupled to the internal bus 210. The I/O request processing control circuit 1001 inputting the pattern output synchronizing signal 1003 generates an I/O request signal 4 and an I/O mode designating signal 5 in response to the signal 1003. The information processor further comprises an I/O request receiving circuit 15 for controlling an operation of the CPU 1000 upon receipt of the I/O request signal 4 and the I/O mode designating signal 5 from the circuit 1001, an instruction register 18 for storing the instruction to be executed, an instruction decoder 19 for generating various control signals according to contents of the instruction register 18, an execution control unit 20 for controlling a general operation of the execution division according to an output of the instruction decoder 19, a macro service register 21 comprising a memory pointer (MP) 21-1 for designating an address of the data memory 3, a port pointer (hereinafter called PORTP) 21-2 for designating a port, and a terminal counter (TC) 21-3 for storing a number of times macro service is implemented. The output unit 1006 comprises an output register 1006-2 for outputting pattern data and a port 1006-1, and a pattern output line 1006-3. It is preferable that the pattern output division 1006 be provided with at least two stages of registers connected in series as described hereinafter.

An arbitrary value can be set in the register 21 according to a program. In this embodiment, address information of the pattern output data loading area 3-10 is loaded in MP 21-1 of the macro service register 21, designating information of the output register 1006-2 is loaded in PORTP 21-2, and a pattern output frequency is loaded in TC 21-3 beforehand.

An instruction word stored in an address of the program memory 13 designated normally by a content of the program counter 12 is set in the instruction register 18, the instruction word transferred to the instruction register 18 is interpreted in the instruction decoder 19, and thus the execution control unit 20 controls each part to execute the main program. The I/O request receiving circuit 15 samples the I/O request signal 4 at every completion of the instruction execution, and repeats the above operation when it is on a low level.

When the I/O request signal 4 is of a high level, a level of the I/O mode designating signal 5 is detected. When the level of the I/O mode designating signal 5 is low, conventional interruption handling (the first mode) is executed.

On the other hand, where the I/O mode designating signal 5 is at a high level, the I/O request receiving circuit 15 recognizes the macro service (the second mode). The CPU inhibits updating of the program counter 14, and executes the following processing operations without saving contents of the program counter 14 and the program status word register 16 to the stack area of the data memory 3:

(1) The execution control unit 20 reads output pattern data out of the output data loading area 3-10 pointed by MP 21-1 of the register 21, transfers it to the output register 1006-2 pointed by PORTP 21-2, and sends it to the output line 1006-3 through the port 1006-1.

(2) A value of MP 21-1 is incremented by 1 by means of ALU 17, and the incremented value is loaded in MP 21-1.

(3) A value of TC 21-3 is decremented by 1 by means of ALU 17, and decremented value is loaded in TC 21-3.

The macro service for outputting pattern data to the port is executed according to the above processing operations. Here, when the value of TC 21-3 becomes 0 through subtraction, the I/O request control circuit 1001 makes the I/O request signal 4 active again, and turns the I/O mode designating signal 5 to a low level at the same time, and thus generates and interruption request according to the first mode to perform a pattern output complete processing.

FIG. 11 is a block diagram of an embodiment similar to that shown in FIG. 10, embodiment wherein the output register 1006-2 of the embodiment in FIG. 10 is made to work as a first output register, a second output register 1006-4 is provided longitudinally thereof, and thus the register is constituted in two stages.

The operation of the information processor of FIG. 11 generally is the same as in the case of the embodiment of FIG. 10.

Generally I/O requests come in a group for processing according to an order of priority. The ones with a low priority are subject to a control of pending acceptance. In case an I/O request with lower priority level is generated during processing of a particular I/O request, the low priority processing is held, but if the held I/O request is a pattern information output request, then there may arise a delay from generation of the request to pattern output.

In the processor of FIG. 11, synchronously with the pattern information output synchronizing signal 1000 being of an active level, the data held in the first output register 1006-2 is transferred to the second output register 1006-4 and outputted through the port 1006-1. Accordingly, from setting a pattern information to output to the second output register 1006-4, the pattern information can be outputted despite the I/O request being held.

In the embodiment of FIG. 11, when the I/O request with a higher priority order is completed and thus the pattern information is ready for output processing, the pattern information to be output next is loaded in the second register 1006-4 through macro service operation as in the case of the embodiment in FIG. 10.

As described above, in the processor with a precedence control, an output pattern low in priority is ready for transmission even during execution of high priority I/O request, by configuring the output port in two stages, thus suppressing a time lag from generation of the pattern output request to data output.

Figure 12:
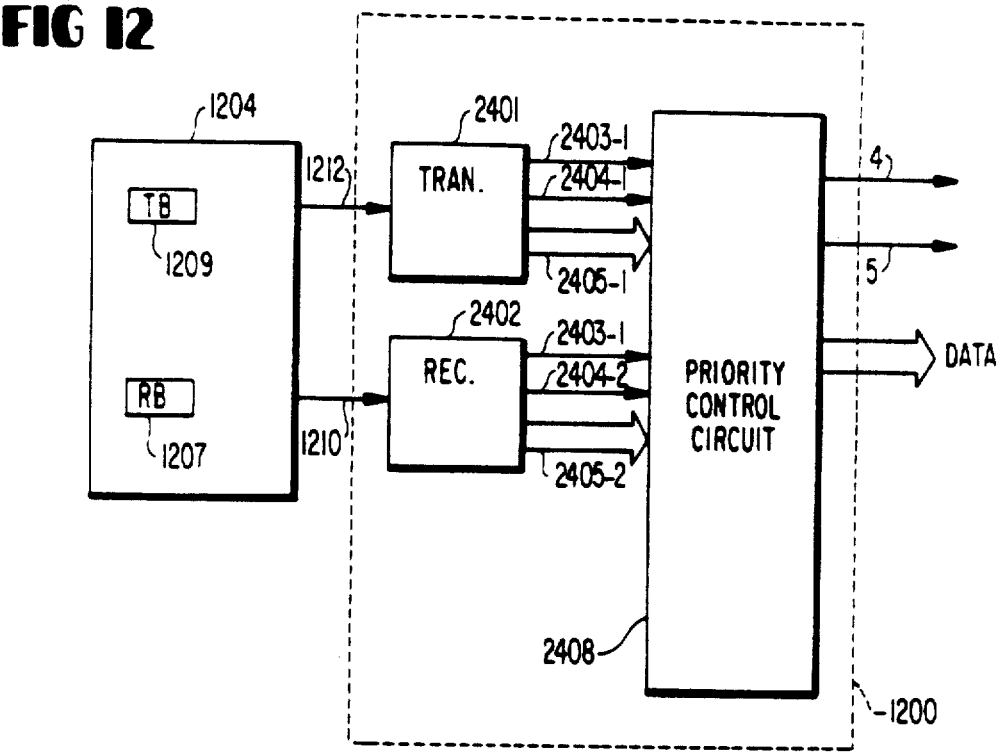

FIG. 12 shows an embodiment of the present invention having a serial data communication function.

First, referring to the block diagram of FIG. 12, an operation for I/O requests of transmission and reception in the serial data transmission will be described. The serial data transmitter 1204 has the receiving buffer register 1207 (hereinafter called a receiving buffer) and the transmitting buffer register 1209 (hereinafter called a transmitting buffer), and outputs the reception end signal 1210 and the transmission end signal 1212 to an I/O request control unit 1200 as an interruption. The I/O request control unit 1200 comprises a transmission I/O request circuit 2401 for generating an I/O request for completion of transmission (hereinafter called a transmission I/O request) upon receipt of the transmission end signal, a reception I/O request circuit 2402 for generating an I/O request for completion of reception (hereinafter called a reception I/O request) upon receipt of the reception end signal, transmission/reception I/O request lines 2403-1, 2403-2, transmission/reception I/O processing mode designating lines 2401-1, 2404-2 for designating transmission/reception I/O processing modes, I/O request line 4, I/O mode designating line 5, transmission/reception I/O request buses 2405-1, 2405-2, and a priority control circuit 2408. When the transmitting buffer 1209 becomes empty for transmission, the transmission I/O request line 2403-1 gets active, and if the transmission I/O request circuit 2401 is in a position to process the transmission I/O request through interruption in this case, the transmission I/O mode designating line 2404-1 is turned to a low level, and an interruption branch address is put out to the transmission I/O request bus 2405-1. Then, when the request is to be processed as the macro service, the transmission I/O mode designating line 2404-1 is turned to a high level, and an address of a first macro service register group 21 (FIG. 13) which will be described later is outputted to the circuit 2408 through the transmission I/O request bus 2405-1. Further, when the receiving data is loaded in the receiving buffer 1007, the reception I/O request becomes active, and the reception I/O request circuit 2402 operates in the same way as above other than outputting an address of a second macro service register group 22 (FIG. 13), which will be described later, to the I/O request bus.

The circuit 2408 selects the highest priority I/O request, and makes the I/O request line 4 and the I/O mode designating line 5 active.

Figure 13:
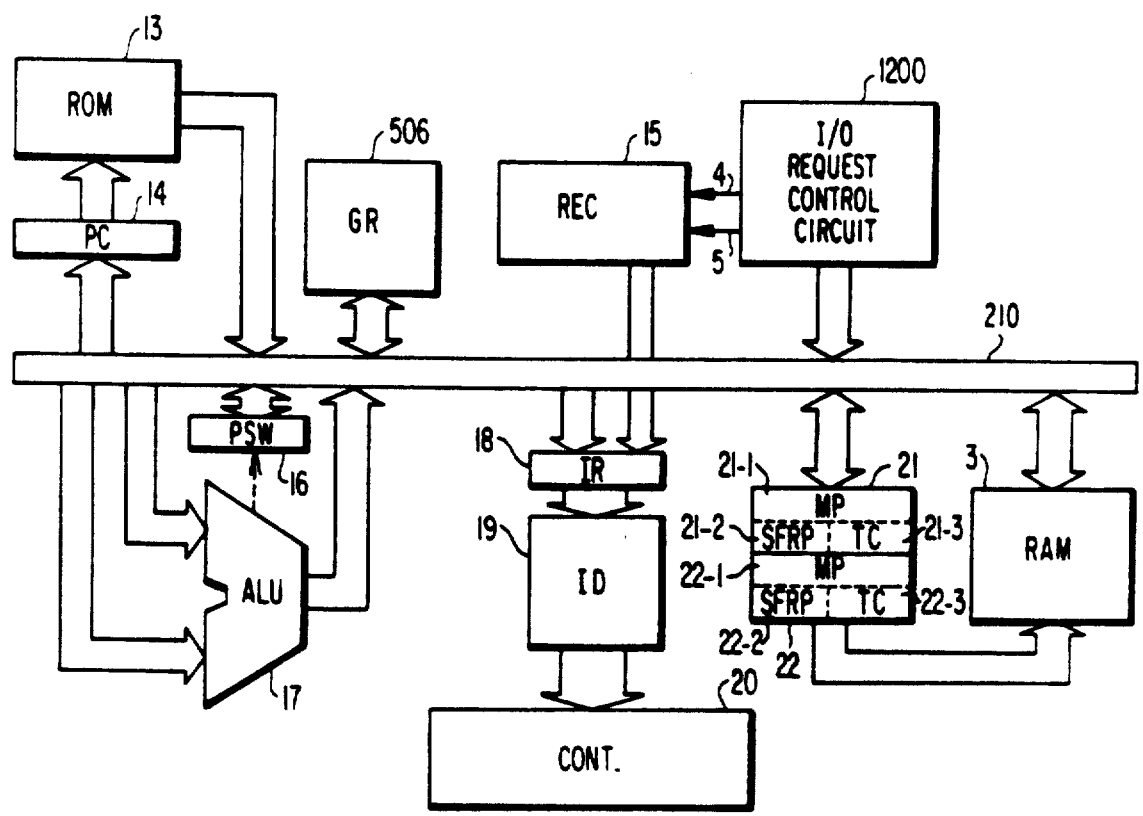

Next, FIG. 13 is a block diagram of a CPU. In FIG. 13, the CPU comprises the unit 1200, the I/O request receiving circuit 15 for controlling an operation of the CPU upon receipt of the I/O request signal and the I/O mode designating signal from the I/O request control unit 1200 of FIG. 12, the program memory 13, the data memory 3, the program counter 14, the status word register 16, the ALU 17, a general purpose register set 506 for holding the data in processing temporarily, the instruction register 18, the instruction decoder 19, and the execution control unit 20. The CPU further comprises first and second macro service register groups 21, 22 constituted of memory pointers (MP) 21-1, 22-1 for designating an address of the data memory 3, SFR pointers (SFRP) 21-2, 22-2 for designating an address of a special register, and terminal counters (TC) 21-3, 22-3 for holding the number of times the macro service is implemented. An arbitrary value can be set in the first and second register groups 21, 22 by software.

In this embodiment, the arrangement is such that an address of the loading area of transmitting data is loaded in MP 21-1 of the first register group 21, a transmitting buffer address is loaded in SFRP 21-2, a transmission frequency is loaded in TC 21-3, an address of the receiving data loading area is loaded in MP 22-1 of the second automatic transmission register group 22, a receiving buffer address is loaded in SRFP 22-2, and a reception frequency is loaded in TC 22-3 beforehand by software.

Next, an operation will be described with reference to the block diagrams of FIG. 12 and FIG. 13. The CPU transfers an instruction stored in the program memory 13, which corresponds to a content of the program counter 14 to the instruction register 18. The instruction decoder 19 and the execution control unit 20 then operate according to the instruction transferred to the instruction register 18, thereby realizing normal program execution. A value of the program counter 14 is updated to an address of the instruction to execute next after each instruction is executed The I/O request receiving circuit 15 samples the I/O request line 4 after each instruction has been executed, and when it is on an inactive level, the normal program operation is continued.

Next, when the I/O request receiving circuit 15 detects that the I/O request line 4 has taken an active level through sampling, a level of the I/O mode designating line 5 is also sampled simultaneously. If the level of the I/O mode designating line 5 is low, then the first mode is set in the CPU. On the other hand, when the I/O mode designating line 5 is at a high level, the macro service code is set in the CPU. The execution control unit 20 forbids address updating of the program counter 14. In this case, the contents of the program counter 14, the program status word register 16, and the general purpose register set 506 are not saved in the stack with the values retained in the areas, and the following processing sequence is commenced.

(1) The I/O request control unit 1200 outputs an address of the first macro service register 21 onto the internal bus 210.

(2) The execution control unit 20 reads the address of the first macro service register group 21 to select the register group.

(3) The execution control unit 20 reads transmitting data from the transmitting data loading area in the RAM 3 pointed by MP 21-1 and transfers it to the transmitting buffer 1209 pointed by SFRP 21-2.

(4) A value of MP 21-1 is incremented by 1 by means of ALU 17 and the incremented value is stored in MP 21-1.

(5) A value of TC 21-3 is decremented by 1 by means of ALU 17 and the decremented value is stored in TC 21-3.

The macro service data transmission ends after a series of the above processing operations. However, when a value of TC 21-3 becomes 0 through subtraction, the transmission I/O request circuit 2401 makes the transmission I/O request line 2403-1 active again and turns the transmission I/O mode designating line 2404-1 to a low level simultaneously to generate the transmission interrupt request. In this case, accordingly, when the macro service ends, the transmission interruption program is activated, as the transmission interrupt request has been generated.

An operation when a reception I/O request is generated will be described next. When the I/O mode designating line 5 is at a low level, the reception I/O request is generated. A method for activating the reception interruption handling is the same as in the case of a transmission I/O request, except that the I/O request control unit 1200 outputs a reception interrupt branch address onto the internal bus 210. When the I/O mode designating line 5 is at a high level, the I/O request receiving circuit 15 recognizes the request to be the macro service and forcibly sets a code in the instruction register 18. In this case, the execution control unit 20 inhibits address updating of the program counter 14. The CPU commences the following processing sequence as holding contents of the program counter 14, the status word register 16, and the general purpose register set 506:

(1) The I/O request control unit 1200 outputs an address of the second macro service register group 22 to the internal bus 210.

(2) The execution control unit 20 reads the address of the second register group 22 to select the register group.

(3) The execution control unit 20 reads a receiving data from the receiving buffer 1207 pointed by SFRP 22-2 of the second register group 22 and transfers it to the receiving data loading area in the RAM 3 pointed by MP 22-1.

(4) A value of MP 22-1 is incremented by 1 by means of ALU 17 and the incremented value is stored in MP 22-1.

(5) A value of TC 22-3 is decremented by 1 by means of ALU 17 and the decremented value is stored in TC 22-3.

The macro service data transmission for reception comes to end through a series of the above processing sequence. However, when a value of TC 22-3 becomes 0 through subtraction, the reception I/O request circuit 1200 makes the reception I/O request line 2403-2 active again as in the case of transmission, and turns the reception I/O mode designating line 2404-2 to a low level to generate a reception interrupt request. In this case, accordingly, when the macro service data transmission in reception is over, the normal reception interruption program is activated.

As described above, the serial data processor according to the present invention is capable of controlling a processing mode of reception interruption and transmission interruption and another processing mode of macro service data transmission according to a reception I/O request and macro service data transmission according to transmission I/O request selectively to cope with a reception I/O request and a transmission I/O request. Further, when interruption is selected on software, various data processing induced by transmission/reception I/O requests can be manipulated on an interruption program as before.

Another type of information processor which can perform data transmission according to character control now will be described.

In an information processor provided with a generation circuit for generating a first processing request accompanying a transmission and a second processing request accompanying a reception, a memory circuit for storing transmitting/receiving data and programs, and a CPU for performing processing functions according to the first and second processing requests and programs. The CPU has data transmission means capable of processing data transmission corresponding to the first and second processing requests as holding its own state relating to the program execution, and data detection means for processing a predetermined detection of transmitting/ receiving data.

According to this embodiment, a data transmission for character control between a transmitting buffer register or a receiving buffer register and a data memory according to I/O requests of completion in transmission and reception can be executed without interposition of a program manipulation.

According to the data transmission (hereinafter called search mode automatic data transmission), when an I/O request from peripheral hardware is generated, the CPU suspends a current operation for program execution and processes a data transmission through a control on a predetermined character search without an interposition of other program manipulations as holding the then-current CPU status (program counter and program status word) and the data in a general purpose register set. Further, for protection of the data memory on the reception side from a transmission runaway which can arise with sequential processing, a maximum data transmission/reception frequency is set other than detection of a coincidence with a search character, and thus serial transmission or reception will be completed according to a coincidence with the maximum data transmission/reception frequency regardless of a miss, if any, in the detection of a coincidence with the search character. As described, in search mode automatic data transmission, a generation frequency of the transmission complete interruption or the reception complete interruption which is processed substantially on software is minimized, the CPU is less burdened for software processing, and double data transmission control is realized through search character control and maximum transmission frequency control.

Further, in search mode automatic data transmission, processing after completion in a predetermined number of transmissions and receptions according to a coincidence of the transmitting/receiving data with a predetermined search character, or a coincidence of the data transmission frequency with a maximum data transmission/reception frequency is met by interruption.

Figure 14:
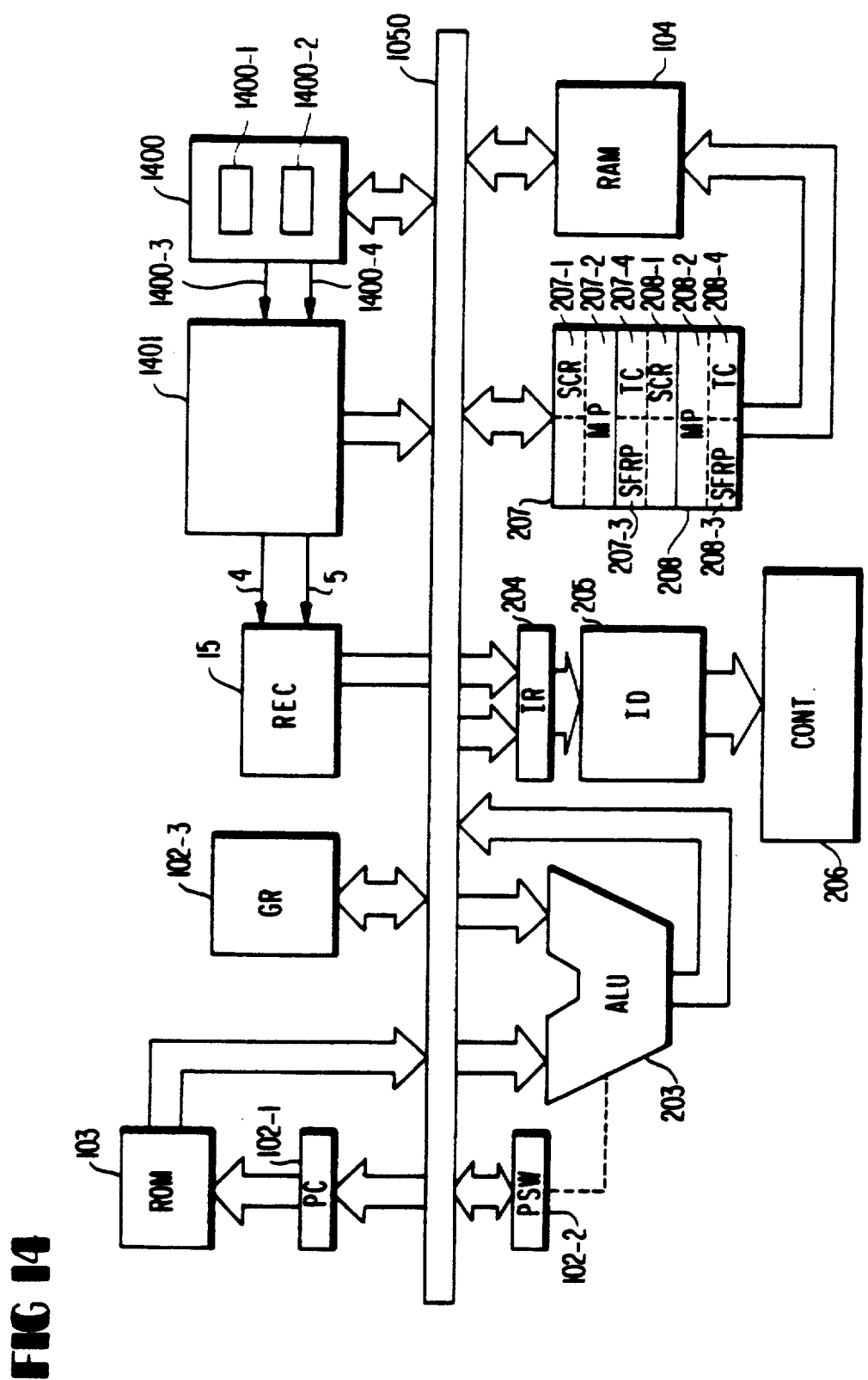

FIG. 14 is a block diagram representing circuitry for implementing the above-described function. A serial data transmitter 140 has a transmitting buffer register 1400-1 and a receiving buffer register 1400-2, and outputs a transmission complete signal 1400-3 and a reception complete signal 1400-4 to an I/O request control circuit 1401. The CPU circuit comprises an I/O request receiving circuit 15 for controlling an operation of the execution circuit upon receipt of an I/O processing execution request line 4 and an I/O processing execution mode designating line 5 from the I/O request control circuit 1401, a program memory 103 for loading programs such as interruption handling program and the like, a data memory 104 for holding transmission/-reception processing data, a program counter 102-1 for pointing an address of the program to execute next, an arithmetic logical operation unit (hereinafter called ALU) 203 having an arithmetic logical operation function, a program status word register 102-2 indicating a general operating state of the CPU, the general purpose register set 102-3 for holding data in processing, an instruction register 204 for holding the instruction to execute next, an instruction decoder 205 for interpreting contents of the instruction register 204 and generating various control signals, and an execution control circuit 206 for controlling a general operation of the CPU according to an output of the instruction decoder 205. Further, the CPU includes first and second search mode automatic data transmission register groups 207, 208 which in turn comprise search character registers (hereinafter called SCR) 207-1, 208-1 for holding a value of the search character for detecting a serial transmission/reception completion, memory pointers (hereinafter called MP) 207-2, 208-2 for designating an address of the data memory, SFR pointers (hereinafter called SFRP) 207-3, 208-3 for designating an address of the special register, and terminal counters (hereinafter called TC) 207-4, 208-4 for holding a transmission frequency of the search mode automatic data transmission. All the above circuitry elements are connected to the internal bus 1050.

With reference to the block diagram, an operation of the search mode automatic data transmission in serial transmission and reception according to the present invention will be described below.

In regard to a transmission I/O request, when the transmitting buffer register 1400-1 becomes empty from sending transmitting data externally, the serial data transmitter 1400 outputs first the transmission complete signal 1400-3 to the I/O request control circuit 1401. The I/O request control circuit 1401 then outputs a signal to the I/O request receiving circuit 15 through the I/O processing execution request line 4 and the I/O processing execution mode designating line 5. Upon detection of the I/O processing execution request line 4 as being active, the I/O request receiving circuit 15 samples a level of the I/O processing execution mode designating line 5, and if the level is low, then the I/O request receiving circuit 15 recognizes the I/O request as an interruption handing (first mode), and sets an interruption handling code in the instruction register 204. The execution control circuit 206 then forbids updating of an address of the program counter 102-1 and sets aside values of the program counter 102-1 and the program status word register 102-2 in the data memory 104. The above procedure occurs in normal interruption handling (first mode). Next, the I/O request control circuit 1401 outputs a branch address of the transmission interruption program onto the internal bus 1050, and the execution control circuit 206 transfers the interruption branch address to the program counter 102-1, thereby activating the transmission interruption handling program. When the interruption service program comes to end, data set aside in the data memory 104 are returned to the program counter 102-1 and the program status word register 102-2, and a program manipulation on the way to execution is recommenced.

On the other hand, if the I/O processing execution mode designating line 5 is at a high level, the I/O request receiving circuit 15 recognizes the I/O request as a search mode automatic data transmission request and sets a search mode automatic data transmission processing code in the instruction register 204. The execution control circuit 206 forbids updating of an address of the program counter 102-1 and commences the following processing as holding values of the program counter 102-1, the program status word register 102-2 and the general purpose register set 102-3.

First, the I/O request control circuit 1401 outputs an address of the first search mode automatic transmission register group 207 onto the internal bus 1050, and the execution control circuit 206 reads the address of the first search mode automatic transmission register group 207 to select the register group. Next, the execution control circuit 206 reads transmitting data out of a transmitting data loading area in the data memory 104 pointed by MP 207-2 of the first search mode automatic data transmission register group 207, performs a subtraction with a value of SCR 207-1 by means of ALU 203. If the result is not 0, the transmitting data is transferred to the transmitting buffer register 1400-1 pointed by SFRP 207-3. Then, a value of MP 207-2 is incremented by 1 by means of ALU 203 and reloaded in MP 207-2, and a value of TC 207-4 is decremented by 1 and reloaded in TC 207-4.

A series of the above processing is performed to complete one iteration of the search mode automatic data transmission once in the serial transmission. However, when the result obtained through subtracting the value of SCR 207-1 from the transmitting data becomes 0, that is, a coincidence of the search character with the transmitting data is detected, or the value of TC 207-4 becomes 0 through subtraction, the series of data transmission is regarded as completed, the transmitting data is transferred to the transmitting buffer register 1400-1. The I/O request control circuit 1401 then makes the I/O processing execution request line 201-1 active again and turns the I/O processing execution mode designating line 201-2 to a low level to generate a transmission interruption request, thus activating the transmission interruption program.

An operation for receiving an I/O request will be described next. When the receiving buffer register 1400-2 becomes full, the serial data transmitter 1400 outputs the reception complete signal 1400-4 to the I/O request control circuit 1401. The I/O request control circuit 1401 then outputs the I/O processing execution request line 4 and the I/O processing execution mode designating line 5 to the I/O request receiving circuit 15. The I/O request receiving circuit 15 detects that the I/O processing execution request line 4 is active and samples a level of the I/O processing execution mode designating line 5, and if the line is at low level, then the I/O request receiving circuit 15 recognizes the I/O request as an interruption handling and activates the reception interruption handling program. The processing operation in this case is the same as in the case of transmission I/O request except that the I/O request control circuit 1401 outputs a branch address of the reception interruption service program onto the internal bus 1050.

When the I/O processing execution mode designating line 5 is of a high level, the I/O request receiving circuit 15 recognizes the I/O request as a search mode automatic data transmission request, and set a search mode automatic data transmission processing code in the instruction register 204. The execution control circuit 206 forbids updating of an address of the program counter 102-1, and commences the following processing as holding values of the program counter 102-1, the program status word register 102-2 and the general purpose register set 102-3.

The I/O request control circuit 1401 outputs an address of the second search mode automatic transmission register group 208 onto the internal bus 1050, and the execution control circuit 206 reads the address of the second search mode automatic data transmission register group 208 to select the register group.

Next, the execution control circuit 206 reads receiving data out of the receiving buffer register 1400-2 pointed by SFRP 208-3 of the second search mode automatic data transmission register group 208, performs a subtraction with a value of SCR 208-1 by means of ALU 203, and if the result is not 0, the receiving data is transferred to a receiving data loading area in the data memory 104 pointed by MP 208-2. Then a value of MP 208-2 is incremented by 1 by means of ALU 203 and reloaded in MP 208-2, and a value of TC 208-4 is decremented by 1 and reloaded in TC 208-4.

A series of the above processing is performed to complete one iteration of the search mode automatic data transmission in the serial transmission. However, when the result obtained through subtracting the value of SCR 208-1 from the receiving data becomes 0, that is, a coincidence of the search character with the receiving data is detected, or the value of TC 208-4 becomes 0 through subtraction, a series of data reception is regarded as completed, the receiving data is loaded in the receiving data loading area 1400-2, the I/O request control circuit 201 makes the I/O processing execution request line 4 active again as in the case of transmission. The I/O processing execution mode designating line 5 is then turned to a low level, and thus the reception interruption request is generated to activate the reception interruption program.

As described above, according to this embodiment of the present invention, a serial information processor is realizable which operates on two kinds of means to cope with transmission reception I/O requests, if any, through a normal software interruption handling and a search mode automatic data transmission, which can be selected properly by software.

Particularly in the search mode automatic data transmission, the time required for shunt and return of CPU status and data and execution of instructions can be decreased greatly by eliminating software interruption processing. Further, rapid and reliable data transmission can be ensured by a double control on character and maximum transmission frequency.

Then, in a serial data transmission system employing a plurality of serial information processors with an address allocated beforehand as another embodiment, a destination serial information processor will be selected without interposition of an interruption handling on software. Thus, serial data transmission can be commenced by performing search mode automatic data transmission processing with address information of each serial information processor set as a search character and the search character set as a start information for serial data transmission. Accordingly, it goes without saying that a serial data transmission system configuration according to the search mode automatic data transmission processing for which the search character having an address information of each serial information processor and the search character having an end information of the serial data transmission are both combined can easily be realized.

Figure 15:
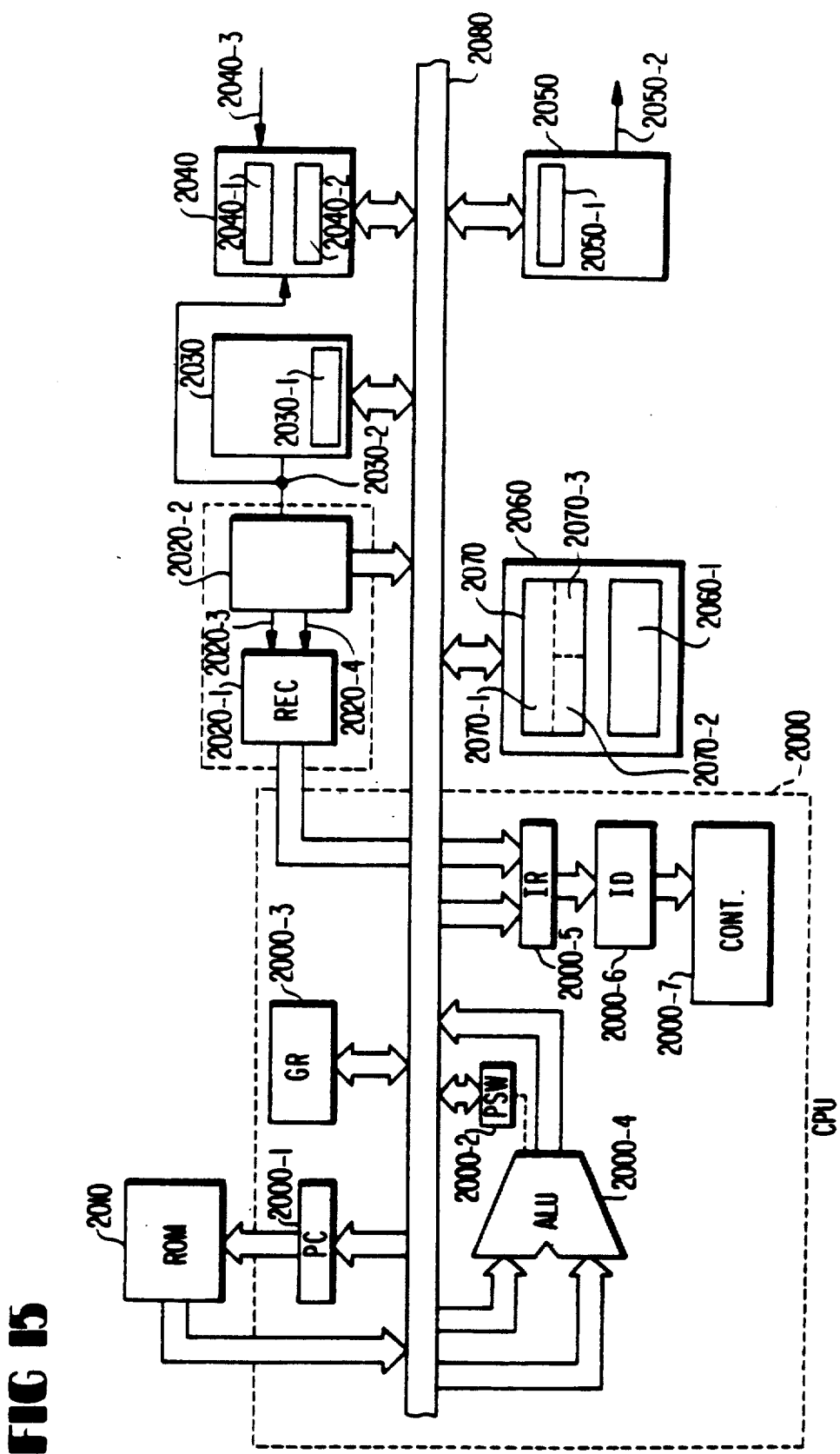

Still another embodiment of this invention is shown in FIG. 15 wherein DC motor driving gear is controlled. In a DC motor driving gear provided with a timer for generating a processing request at desired time intervals, a counter for counting an input pulse, a D/A converter, a memory for storing a program and various data, a CPU for selectively performing processing according to a processing request and processing according to the stored program, the invention is characterized in that when the timer generates the processing request, the CPU suspends program execution, creates speed deviation data without setting aside the current status, and transmits it to the D/A converter.

In FIG. 15, a timer 2030 has a timer register 2030-1 and outputs a timer I/O request signal 2030-2 to an I/O request control circuit 2020-2. A conversion data processing control circuit 2020 has an I/O request control circuit 2020-2, an I/O processing execution request line 2020-3, and I/O processing execution mode designating line 2020-4 and an I/O request acceptance circuit 2020-1 for controlling an operation of a CPU 2000. The CPU 2000 comprises a program counter 2000-1 for pointing an address of the program to execute next, an arithmetic logical operation unit (ALU) 2000-4 having an arithmetic logical operation function, a program status word register 2000-2 for indicating a general operating state of the CPU, a general purpose register set 2000-3 for holding data in processing, an instruction register 2000-5 for holding the instruction to execute next, an instruction decoder 2000-6 for interpreting contents of the instruction register 2000-5 and generating various control signals, and an execution control circuit 2000-7 for controlling a general operation of the CPU on an output of the instruction decoder 2000-6. A macro-service register group 2070 necessary for performing macro-service (second interruption mode) is provided as part of a data memory 2060. The macro-service register group 2070 comprises a memory pointer (MP) 2070-1 for designating an address of a command value table area 2060-1 set beforehand in the data memory 2060, a pointer (SFRP) 2070-2 for designating an address of a D/A register 2050-1, and a terminal counter (TC) 2070-3 for holding a data transmission frequency to the D/A register by the macro-service. A counter 2040 has a count register 2040-1 and a count capture register 2040-2. The count register 2040-1 counts an encoder pulse inputted on a count input line 2040-3, transmits a count register value to the count capture register 2040-2 in response to the timer I/O request signal 2030-2, and is cleared immediately thereafter. A D/A converter 2050 has a D/A register 2050-1 and outputs a voltage corresponding to a value set in the D/A register 2050-1 through a D/A converter output line 2050-2. The output is then impressed on the DC motor as an analog signal.

Operations of the first mode and the second mode (macro-service) now will be described with reference to FIG. 15. When the time corresponding to the value set in the timer register 2030-1 from the timer 2030 passes, the timer I/O request signal 2030-2 becomes active. Recognizing the timer request signal 2030-2 as active, the I/O request control circuit 2020-2 makes the I/O request acceptance circuit 2020-1 drive the I/O request line 2020-3 and the I/O mode designating line 2020-4. Upon detection of the I/O request line 2020-3 being active, the I/O request acceptance circuit 2020-1 samples a level of the I/O mode designating line 2020-4. If it is at a low level, then the I/O request acceptance circuit 2020-1 recognizes the I/O request as an interruption handling request (first mode), and sets an interruption handling code in the instruction register 2000-5. The execution control circuit 2000-7 then forbids updating of an address of the program counter 2000-1 and sets aside values of the program counter 2000-1, the program status word register 2000-2 to the data memory 2060. Next, the I/O request control circuit 2020-2 outputs a branch address of a timer interruption program onto an internal bus 2080, and the execution control circuit 2000-7 sets the interruption branch address in the program counter 2000-1, thereby activating the timer interruption program. When the interruption service program ends, data set aside in the data memory 2060 are returned to the program status word register 2000-2 and the program counter 2000-1, and the suspended program manipulation is recommenced. As noted, the above-described operation constitutes the first interruption mode.

On the other hand, if the I/O processing execution mode designating line 2020-4 is at a high level when the I/O request line 2020-3 becomes active, the I/O request acceptance circuit 2020-1 recognizes the I/O request as a macro-service request (second mode), and sets a macro-service code in the instruction register 2000-5. The execution control circuit 2000-7 commences the following processes as holding the status of the program counter 2000-1, the program status word register 2000-2 and the general purpose register set 2000-3. First, the I/O request control circuit 2020-2 outputs an address of the macro-service register group and, the execution control circuit 2000-7 reads the address and selects the register group. Next, the execution control circuit 2000-7 reads a data of the address pointed by MP 2070-1, or the current command value out of the command value table area 2060-1 and performs a subtraction with the count capture register 2040-2 by means of ALU 2000-4. The result is transferred to the address pointed by SFRP 2070-2, namely the D/A register 2050-1. Then, a value of MP 2070-1 is incremented by 1 by means of the ALU 2000-4 and reloaded in MP 2070-1. On the other hand, a value of TC 2070-3 is decremented by 1' and reloaded in TC 2070-3.

The voltage to be impressed on the motor is thus changed automatically to a voltage whereby the motor rotational speed will follow the command value referred to by MP 2070-1 by updating of the D/A register according to an I/O request from the timer through a series of the above processings. When TC 2070-3 becomes 0 through the subtraction, the I/O request control circuit 2020-2 regards a series of acceleration or deceleration processing steps as having been completed and makes the I/O request line 2020-3 active again. Further, the I/O mode designating line 2020-4 is returned to a low level, a timer interruption is generated forcibly, and the software is advised of an end of a series of macro-service.

As described above, according to this embodiment of the present invention, a generation of the interruption for which a software processing is required will be decreased, and the time spent on shunt and return of the program counter, program status word and general purpose register, branch processing to the interruption handling program, reading of the instruction, decoding and the like can be reduced substantially. Consequentially, a deterioration in throughput of CPU can be minimized. Further, the command value need not be updated, or for example, MP 2070-1 is not incremented by 1 and the command value is taken from the same table at all times for a constant-speed rotation, thereby controlling it easily. As described, the DC motor driving gear according to this embodiment has an period-establishing D/A conversion data processing control means, thus ensuring a very high feasibility.

Still another embodiment may be provided which is suitable to a serial data transmission requiring a time monitoring. A serial interface generates an interruption whenever one data is transmitted or received, serial data is transmitted or received through software processing in a CPU, and a timer allocated to the serial interface operates for a time monitoring of normal serial transmission/reception, that is, a reception completion at a destination within a constant period of time in a serial transmission, and a presence of received data within a constant period of time in serial reception are detected.

In an information processor provided with a serial data transmitter for generating a request to send for transmission and a request to receive for reception, a timer for generating a measurement complete processing request for completion of a time measurement, a memory circuit for storing transmission/reception data and programs, a CPU for executing processings according to the request to send, request to receive and measurement complete processing request, the invention comprises data transmitting means for transmitting data corresponding to the request to send and request to receive as holding a status of the CPU for program manipulation, a serial transmission/reception abnormality detecting means for detecting abnormalities according to the measurement complete processing request of the timer, wherein the CPU monitors predetermined transmission/reception data processing by the data transmitting means and the transmission/reception data processing by the serial transmission/reception abnormality detecting means when the serial data transmitter generates the request to send and request to receive.

Figure 16:
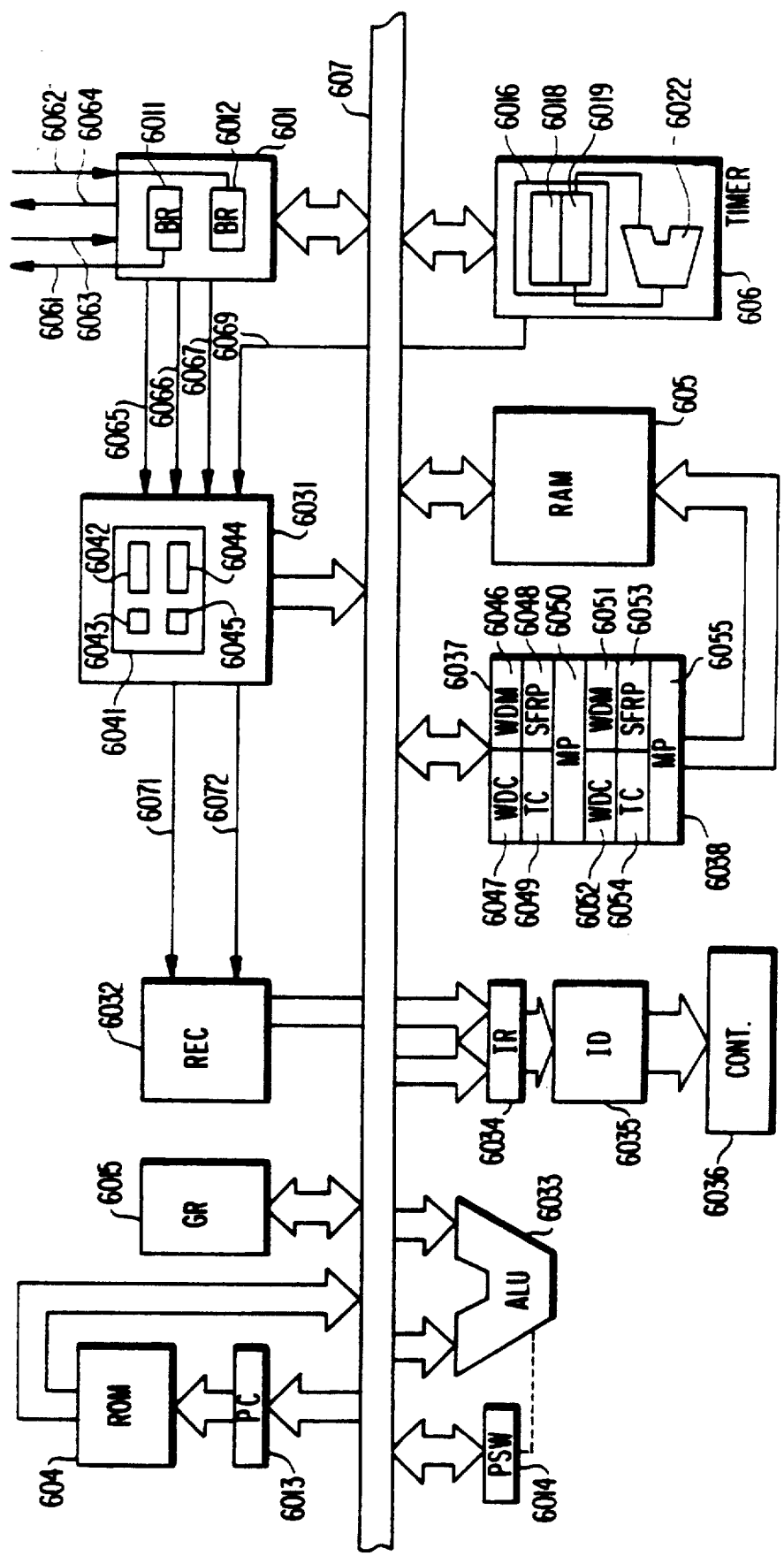

FIG. 16 is a block diagram representing the above-mentioned information processor. In this embodiment, the serial data transmitter 601 has an output transmission line 6061, a transmission buffer register 6011, an input reception line 6062, and a reception buffer register 6012. The serial data transmitter 601 is further provided with a CTS line 6063 and a DSR line 6064 as transmission/reception control signals to output TxBE signal 6065, RxBF signal 6066, and CTS notice signal 6067 to an I/O request control circuit 6031. A timer 606 includes a timer unit timer 6016 and a decremeter 6022. The timer 6016 consists of the timer 0 modulo register 6018 and the timer 0 timer register 6019, and outputs the timer 0 count complete signal 6069 to the I/O request control circuit 6031.

The I/O request control circuit 6031 has a service control register group 6041 consisting of an I/O channel register having an address information of peripheral hardware and a monitoring function enable bit, which comprises a transmission channel register 6042, a transmission monitoring function enable bit 6043, a reception channel register 6044, and a reception monitoring function enable bit 6045.

The CPU comprises an I/O request acceptance circuit 6032 for controlling operation of the execution circuit upon receipt of an I/O processing execution request line 6071 and an I/O processing execution mode designating line 6072 from the I/O request control circuit 6031, a program memory 604 for loading programs such as interruption service program and the like, a data memory 605 for holding a transmission/reception processing data, a program counter (PC) 6013 for pointing an address of the program to execute next, an arithmetic logical operation unit (ALU) 6033 having an arithmetic logical operation function, a program status word (PSW) register 6014 indicating a general operating state of the CPU, a general purpose register set 6015 for holding data in processing, an instruction register 6034 for holding the instruction to execute next, an instruction decoder 6035 for interpreting contents of the instruction register 6034 and generating various control signals, and an execution control circuit 6036 for controlling a general operation of the CPU on an output of the instruction decoder 6035. Further, the CPU has first and second automatic data transmission register groups 6037, 6038 with a monitoring function required for automatic data transmission provided with a monitoring function by the timer (hereinafter called macro-service with monitoring function). The macro-service register groups 6037, 6038 comprise respectively monitoring timer modulo divisions (hereinafter called WDM) 6046, 6051 for software monitoring timers mapped on the memory, monitoring timer counter circuits (hereinafter called WDC) 6047, 6052 and SFR pointers (hereinafter called SFRP) 6048, 6053, for designating an address of a special register, terminal counters (TC) 6049, 6054 for holding a processing frequency of the automatic data transmission, memory pointers (MP) 6050, 6055 for designating an address of the data memory. All of the just-described components are connected to an internal bus 607.

An operation of the macro service data transmission with a monitoring function in the serial transmission/-reception now will be described.

For transmission I/O request processing, first a count value is set in the timer 0 modulo register 6018 and WDM 6046 of the first macro service register group 6037 with monitoring function to obtain a predetermined monitoring time interval (time from transmission completion to destination's reception completion). The predetermined monitoring time can be expressed by the product of a count value of the timer 0 modulo register 6018 and a count value of WDM 6046. When the transmission buffer register 6011 becomes empty from having transmission data sent externally, the serial data transmitter output TxBE 6065 to the I/O request control circuit 6031.

The I/O request control circuit 6031 then outputs the I/O request line 6071 and the I/O mode designating line 6072 to the I/O request acceptance circuit 6032. Upon detection of the I/O request line 6071 being active and also the I/O mode designating line 6072 being at a low level, the I/O request acceptance circuit 6032 recognizes the I/O request as interruption handling (first mode) and executes normal interruption handling accompanying shunt and return of PC 6013, PSW 6014 and the general purpose register set 6015.

On the other hand, if the I/O mode designating line 6072 is at a high level, the I/O request acceptance circuit 6032 recognizes the I/O request as macro service data transmission request with monitoring function, and sets the processing code in the instruction register 6034.

The execution control circuit 6036 performs the next processing as holding values of PC 6013, PSW 6014 and the general purpose register set 6015. First, the I/O request control circuit 6031 outputs an address of the first macro service transmission register group 6037 with monitoring function onto the internal bus 607 through the transmission channel register 6042. The execution control circuit 6036 then reads the address to select the first register group 6037 with monitoring function. Next, the execution control circuit 6036 reads transmission data out of a transmission data loading area A pointed by MP 6050 of the first register group 6037, and transfers it to the transmission buffer register 6011 pointed by SFRP 6048. The execution control circuit 6036 further transfers a value of WDM 6046 to WDC 6047, turns the transmission monitoring function enable bit 6043 in the service control register group 6041 of the I/O request control circuit 6031 to "1", and then sends a start signal to the timer (0) for controlling the monitoring software timer. Then, a value of MP 6050 is incremented by "1" through ALU 6033, reloaded in MP 6050, and a value of TC 6049 is decremented by "1" and reloaded in TC 6049, thus completing the macro service data transmission.

Then, when the value of TC 6049 becomes "0" through the subtraction, a series of data transmission is regarded as completed, the I/O request control circuit 6031 makes the I/O request line 6071 active again and turns the I/O mode designating line 6072 to a low level in this case to generate a transmission interruption request (first mode), thus activating the transmission interruption service program.

The timer (0) 6016, having started according to the macro service data transmission on transmission I/O request, outputs the timer 0 count complete signal 6069 to the I/O request control circuit 6031 according to a value set in the timer 0 module register 6018 at every predetermined time interval. The I/O request control circuit 6031 turns the I/O processing execution request line 6071 active and the I/O processing execution mode designating line 6072 to a high level, and advises the I/O request acceptance circuit 6032 of a timer 0 automatic data transmission.

For the timer 0 macro service data transmission, the following processing steps executed by the I/O request control circuit 6031 and the execution control circuit 6036.

1) Address information of a first channel register (or the transmission channel register 6042) in the service control register group 6041 of the I/O request control circuit 6031 is output onto the internal bus 607.

2) The execution control circuit 6036 reads the address to select the first register group 6037 with monitoring function, and decrements a value of WDC 6047 by 1 through ALU 6033.

3) The transmission monitoring function enable bit 6043 is checked, and if it is "1", the decremented result is reloaded in WDC 6047, but if "0", then it is not reloaded. (Since the transmission monitoring function enable bit 6043 is "1" in this case, the value of WDC 6047 is decremented by 1.)

4) The execution control circuit 6036 advises the I/O request control circuit 6031 of the decrementing having been once completed, and the I/O request control circuit 6031 outputs address information of the next channel register onto the internal bus 607.

Only the value in WDC 6047 of the I/O request source, for which the monitoring function enable bit, is "1" is decremented by 1 by repeating a series of the above processing 1) to 4). Further, should the value of some WDC becomes 0 after a series of subtractions to all the I/O request sources is completed, the I/O request control circuit 6031 makes the I/O request 6071 active again and also turns the I/O designating line 6072 to a low level this time, and activates the timer 0 interruption handling.

Where a normal serial transmission has been performed, the serial data transmitter 601 is advised of the destination's reception completion within a predetermined time by making CTS 6063 active. When CTS 6063 becomes active, the serial data transmitter 601 sends CTS notice signal 6067 to the I/O request control circuit 6031. The I/O request control circuit 6031 then makes the I/O request line 6071 to the I/O request acceptance circuit 6032 active and also turns the I/O mode designating line 6072 to a high level, thereby performing CTS automatic data transmission. With the transmission monitoring function enable bit 6043 in the service control register group 6041 of the I/O request control circuit 6031 kept at "0", the decrementing of WDC 6047 is prevented according to the timer 0 macro service data transmission.

Then, in case an abnormality is caused in serial transmission and thus CTS does not become active within a predetermined time, decrementing of WDC 6047 according to CTS automatic data transmission is not prevented, and as a result of the decrementing of WDC 6047 on the timer (0) 6016 according to macro service data transmission, the value of WDC 6047 becomes "0", and the timer 0 interruption handling is activated, thereby detecting the abnormality on the serial transmission.

A reception I/O request now will be described.

As in the case of the transmission I/O request, a count value is set beforehand in the timer 0 modulo register 6018 and WDM 6052 of the second register group 6038 with monitoring function so as to obtain a predetermined monitoring time interval (data reception interval). When the reception buffer register 6012 becomes full, the serial data transmitter 601 makes DSR active to advise the source of reception completion and outputs RxBF 6066 to the I/O request control circuit 6031. The I/O request control circuit 6031 then outputs the I/O request line 6071 and the I/O mode designating line 6072 to the I/O request acceptance circuit 6032.

The I/O request acceptance circuit 6032 detects that the I/O processing execution request line 6071 is active and samples a level of the I/O request processing execution mode designating line 6072 at the same time. If the I/O request processing execution mode designating line 6072 is at a low level, then the I/O request acceptance circuit 6032 recognizes the I/O request as an interruption handling (first mode), and the reception interruption service program is activated. When the I/O processing execution mode designating line 6072 is at a high level, the I/O request acceptance division 6032 recognizes the I/O request as the macro service data transmission request with monitoring function (second mode), and sets the processing code in the instruction register 6034. The execution control circuit 6036 commences the following processing as holding values of PC 6013, PSW 6014 and the general purpose register set 6015.

The I/O request control circuit 6031 outputs an address of the second register group 6038 with monitoring function onto the internal bus 607, and the execution control circuit 6036 reads the address to select the second register group 6038 with monitoring function.

Next, the execution control circuit 6036 reads reception data out of the reception buffer register 6012 pointed by SFRP 6053 of the second automatic data transmission register group 6038 with monitoring function, transfers it to a reception data loading area D in data memory 605 pointed by MP 6055, transfers further a value of WDM 6051 to WDC 6052, then turns the reception monitoring function enable bit 6045 in the service control register group 6041 of the I/O request control circuit 6031 to "1", and sends a start signal to the timer (0) 6016. The value of MP 6055 is then incremented by "1" and returned to MP 6055 and the value of TC 6054 is subtracted by "1" through ALU 6033 and returned to TC 6054. Thus, the macro service data transmission is completed. When the value of TC 6054 then becomes "0" through subtraction, a series of data reception is regarded as completed, and the reception interruption program is activated (first mode) as in the case of transmission.

The timer (0) 6016, having started according to the serial reception macro service data transmission, outputs the timer 0 count complete signal 6069 to the I/O request control circuit 6032 at predetermined time intervals according to a value set in the timer 0 modulo register 6018. The I/O request control circuit 6031 then makes the I/O request line 6071 active, turns the I/O mode designating line 6072 to a high level, and then advises the I/O request acceptance circuit 6032 of the timer 0 macro service data transmission.

The timer 0 automatic data transmission decreases WDC of the macro service data transmission register group corresponding to the I/O request source for which the monitoring function enable bit in the service control register group 6041 of the I/O request control circuit 6031 all by "1" as in the case of transmission.

In regard to serial reception, the execution control circuit 6036 reads an address of the reception channel register 6044 to select the second register group 6038 with monitoring function, decrements a value of WDC 6052 by "1" through ALU 33, and returns the result to WDC 6052.

When the value of some WDC becomes 0 after a series of decrementing to all I/O request sources is completed as in the case of transmission, the I/O request control circuit 6031 makes the I/O request line 6071 active again and turns the I/O mode designating line 6072 to a low level this time, thus activating the timer 0 interruption handling (first mode).

When serial reception is performed at normal time intervals, WDC 6052 is initialized whenever the data is received through automatic data transmission according to a reception I/O request. However, if there arises an abnormality on serial reception operation and thus the next data is not received within normal time interval, a result of subtraction of the timer (0) 6016 through macro service data transmission comes to "0" as WDC 6052 is not initialized, and thus a timer 0 interruption is activated, thereby detecting the abnormality of the serial reception at the CPU.

Thus, as has been described above in detail with respect to several embodiments, the present invention saves a substantial amount of overhead processing, normally required in a CPU in an interrupt mode, by providing a second interrupt mode (macro service), which may be utilized without retaining values of various counters and registers just prior to interruption.

What is claimed is:

1. An information processor comprising:
   a program memory for storing a program to be executed;
   a central processing unit for performing a normal program operation and an interruption operation; and
   at least one interface unit to be coupled to peripheral equipment for transferring data between said central processing unit and said peripheral equipment,
   said central processing unit including:
   a program counter for reading said program out of said program memory;
   a status word register for storing information representative of an execution condition of said central processing unit;
   a stack memory for saving a content of at least one of said program counter and said status word register;
   said interface unit including:

a mode register which is brought programmably into one of a first state and a second state to produce programmably one of a first mode signal and a second mode signal; and means, coupled to said mode register and responsive to an interruption request signal supplied thereto, for generating first information when said mode register is brought into said first state to produce said first mode signal and second information when said mode register is brought into said second state to produce said second mode signal, said first information designating a first interruption which is executed after the contents of said program counter and said status word register are saved and wherein said program is resumed after completion of execution of said first interruption where the program was interrupted, and said second information designating a second interruption which is executed without the contents of said program counter and said status word register being saved and wherein said program is resumed at its point of interruption after completion of execution of said second interruption where the program was interrupted;

said central processing unit further including means, responsive to said first information, for saving the contents of said program counter and said status word register and thereafter executing said first interruption and resuming said program thereafter by returning the saved contents to said program counter and said status word register, respectively, and means, responsive to said second information, for inhibiting change in the contents of said program counter and said status word register and executing said second interruption without saving the contents of said program counter and status word register and without reading any program from said program memory and resuming said program thereafter by allowing said contents of said program counter and said status word register to change.

2. An information processor as claimed in claim 1, wherein said interface unit includes means for performing an analog to digital conversion.

3. An information processor as claimed in claim 1, wherein said interface unit includes means for performing a digital to analog conversion.

4. An information processor as claimed in claim 1, wherein said interface unit includes means for performing a data communication.

5. An information processor as claimed in claim 4, wherein said data communication means includes means for performing at least one of a data transmission and a data reception.

6. An information processor as claimed in claim 4, wherein said interface unit further includes a timer, said data communication means operating in accordance with an output of said timer.

7. An information processor as claimed in claim 1, wherein said interface unit includes means for driving a motor.

8. An information processor as claimed in claim 1, wherein said peripheral equipment is a printer, and said interface unit transfers data to be printed to the printer.

9. An information processor as claimed in claim 1, wherein said peripheral equipment is a display means and said interface unit transfers data to be displayed to the display means.

10. An information processor as claimed in claim 1, wherein said peripheral equipment is a keyboard means and said interface unit transfers a scanning signal to the keyboard means.

11. An information processor as claimed in claim 1, wherein said central processing unit includes means for executing said first interruption after said second interruption is executed.

12. An information processor comprising:
a program memory for storing a string of instructions for a program to be executed;
a program counter for designating an address of said program memory storing an instruction to be executed;
an execution unit for executing an instruction read from said program memory;
a status word register for storing information representative of an execution condition of said execution unit;
a data memory;
an interrupt control unit including:
a mode register which is brought programmably into one of a first state and a second state; and
means, coupled to said mode register and responsive to an interrupt request, for generating first mode information requiring said execution unit to perform an interrupt operation for said interrupt request by use of said program stored in said program memory when said mode register is programmed to said first state and second mode information requiring said execution unit to perform said interrupt operation for said interrupt request without use of said program stored in said program memory when said mode register is programmed to said second state; and
means for supplying a generated one of said first and second mode information to said execution unit;
said execution unit including:
means, responsive to reception of said first mode information, for suspending a program execution and, after saving contents of said program counter and said status word register, for performing said interrupt operation by executing instructions read from said program memory; and
means, responsive to reception of said second mode information, for suspending a program execution and for performing said interrupt operation without saving the contents of said program counter and said status word register, while holding the contents of said program counter and said status word register as they are and without using instructions stored in said program memory.

* * * * *

UNITED STATES PATENT AND TRADEMARK OFFICE
CERTIFICATE OF CORRECTION

PATENT NO. : 5,159,688
DATED : October 27, 1992
INVENTOR(S) : Matsushima et al.

It is certified that error appears in the above-indentified patent and that said Letters Patent is hereby corrected as shown below:

Col. 5, line 14, after "section", insert --1--;

Col. 5, line 33, delete "counts" and insert --counters--.

Col. 22, line 36, delete "pthe" and insert --the--.

Col. 27, line 31, after "transmitter", insert --1--.

Signed and Sealed this

Twenty-sixth Day of October, 1993

Attest:

BRUCE LEHMAN

*Attesting Officer*      *Commissioner of Patents and Trademarks*